United States Patent
Basden

(10) Patent No.: US 6,397,115 B1
(45) Date of Patent: May 28, 2002

(54) HAZARDOUS MATERIAL CLASSIFICATION SYSTEM

(75) Inventor: Richard A. Basden, Fuquay Varina, NC (US)

(73) Assignee: SmithKline Beecham, Philadelphia, PA (US)

( * ) Notice: Subject to any disclaimer, the term of this patent is extended or adjusted under 35 U.S.C. 154(b) by 0 days.

(21) Appl. No.: 09/415,880

(22) Filed: Oct. 8, 1999

(51) Int. Cl.[7] .......................... G05B 15/00; G05B 21/00
(52) U.S. Cl. .......................................... 700/83; 700/266
(58) Field of Search .............................. 700/17, 79, 83, 700/266; 705/28; 588/260, 261

(56) References Cited

U.S. PATENT DOCUMENTS

| | | | | |
|---|---|---|---|---|
| 5,664,112 A | * | 9/1997 | Sturgeon et al. | 705/28 |
| 5,712,990 A | * | 1/1998 | Henderson | 395/228 |
| 5,726,884 A | * | 3/1998 | Sturgeon et al. | 395/209 |
| 5,965,858 A | * | 10/1999 | Suzuki et al. | 235/375 |
| 6,097,995 A | * | 8/2000 | Tipton et al. | 700/266 |
| 6,341,287 B1 | * | 1/2002 | Sziklai et al. | 707/102 |

* cited by examiner

Primary Examiner—Paul P. Gordon
(74) Attorney, Agent, or Firm—Christopher P. Rogers

(57) ABSTRACT

A computer based hazardous material classification and compliance system and method that provides material classification, specification, documentation and instructions to properly process, package and transport regulated and non-regulated materials. The hazardous material classification and compliance system and method includes three integrated primary modules, a plurality of related subsystems and a plurality of databases. The modules include a scheduling module which allows the user to schedule the processing of a material request, a classification module which allows the user to automatically classify a material, and a packaging module which allows the user to identify and order the necessary materials to package and ship a material. The hazardous material classification and compliance system and method also includes an emergency response component which allows the user to identify the shipped material, the originator of the material request and the designated recipient of the material in response to user inputted data, including material origination information, material destination information and material shipment date.

21 Claims, 35 Drawing Sheets

FROM FIG. 8B.

| | |
|---|---|
| IATALTDQTY | VARCHAR2(15) |
| IATACARPK | VARCHAR2(4) |
| IATAMAXCAR | VARCHAR2(6) |
| IATAFORBID | NUMBER(1) |
| IATAPASFOR | NUMBER(1) |
| IATASP | VARCHAR2(35) |
| IATACAUT | VARCHAR2(150) |
| SOURCES | VARCHAR2(255) |
| RESEARCHER | VARCHAR2(15) |
| RESEARCHERDATE | DATE |
| VERIFIER | VARCHAR2(15) |
| VERIFIERDATE | DATE |
| RECSTATUS | VARCHAR2(10) |
| MARINEPOLLUTE | NUMBER(1) |
| ALTNAME2 | VARCHAR2(255) |
| COMPNAME2 | VARCHAR2(255) |
| SOLVENT | VARCHAR2(75) |
| LD503ROUTE | VARCHAR2(15) |
| HM181RQAMTLB | NUMBER(6.1) |
| HM181RQAMTKG | NUMBER(6.1) |
| LD503ANIMAL | VARCHAR2(15) |
| LD50AMOUNT1 | NUMBER(7.2) |
| LD50AMOUNT2 | NUMBER(7.2) |
| LD50AMOUNT3 | NUMBER(7.2) |
| LC50AMOUNT1 | NUMBER(7.2) |
| LC50AMTCONV | VARCHAR2(15) |
| HM181LTDQTYPK | VARCHAR2(10) |
| HM181BULKPK | VARCHAR2(10) |
| HM181NONBULKPK | VARCHAR2(10) |
| CONCENTROTHER | VARCHAR2(25) |
| MELTPT | VARCHAR2(11) |
| MELTPTC | VARCHAR2(11) |
| IATALTDQTYPK | VARCHAR2(10) |
| CATALOGNO2 | VARCHAR2(25) |
| CASNO2 | VARCHAR2(25) |
| NOTES | VARCHAR2(200) |

ShipToInfo

Name:
Company:
Dept:
Address:
Address:
City:
State:
Country:
Zip:
Phone: Fax:

New —110
Save
Close —112

| Option | Description |
|---|---|
| Supplies | Packaging materials or supplies only |
| Packaging | Complete service of packaging & shipping the request |
| Information | Information only |
| Info/Supplies | Information and supplies |
| Info/Transport | Information and transport |
| Supplies/Transp | Supplies and transport |
| Info/Documental | Information and documentation |

| Option | Description |
|---|---|
| Intra-Glaxo | Products transported between Glaxo-Wellcome facilities |
| Local | Products transported/shipped locally |
| Domestic | Products shipped within the United States |
| International | Products shipped outside the United States |

Not Classified

| ID | AMShipAir | REQDATE | SHIPDATE | METHOD | SHIPTONAME | SHIPTOCITY | SHIPTOSTA |
|----|-----------|---------|----------|--------|------------|------------|-----------|
| 8346 | No Yes | 4/1/96 | | UPS | ------ | BUFFALO | NY |
| 8333 | No Yes | 12/19/95 | | AIRBORNE | ------ | | |
| 8329 | No Yes | 12/9/95 | | AIRBORNE | ------ | SAN JOSE | CA |
| 8341 | No No | 2/14/96 | 11/9/95 | WEST'S DURHAI | ------ | | |
| 8322 | No Yes | 11/8/95 | 11/9/95 | AIRBORNE | ------ | CHICAGO | ILLINOIS |

Refresh ~218

| General | CFR49 | IATA | Toxicity | Clone | Print | New |

Compounds

240 — CFR49
242 — IATA
244 — Toxicity

ChemID: 74103
Name:
Synonym:
CASNo:
    CatalogNo:
FlashPt deg F:        FlashPt deg C:
MP       deg F:       MP       deg C:
BoilPt   deg F:       BoilPt   deg C:
Concen%:              Concen other:
Solvent:
HM181Rq(y/n)
HM181RqAmt
HM181RqAmt
Source:
(shift F2 to expand)

Phase:
Supplier:

TRANSREG:

Marine Pollutant No
Yes-Not Severe
Yes-Severe

Notes:

EnteredBy:     basdanr
EnteredDate:   2/14/96
Researcher:    basdanr
ResearchDate:  2/14/96

ChangedBy
ChangedDate
Verifier
VerifierDate

| General | CFR49 | IATA | Toxicity |

Compounds

Forbidden (y/n) ☐    Inhalation Hazard (y/n) ☐

CFR49

Proper Shipping Name:
HazardClass/Div:    HM181 ID:    PO:
Emergency Response Guidebook (page)
Label:
Packing Instructions    LtdQTY 172    Non-Bulk 173    Bulk 172
Special Provisions:
Caution Handling Instr.:

| General | CFR49 | IATA | Toxicity |

Compounds

IATA

Forbidden (y/n) ■

Proper Shipping Name: [_____]

HazardClass/Div: [_____]  IATAID: [_____]

Subsidiary Risk: [_____]  PO: [_____]

Emergency Response Guidebook (page) [___]

Label: [_____]

Pass. Forbidden: ■  Pass. Pack. Instr.: [_____]  Pass. Max. Amt [_____]

Cargo Pack Instr.: [_____]  Cargo Max. Amt. [_____]

LtdQty. Pack Instr.: [_____]  LtdQty Max. Amt. [_____]

Special Provisions: [_____]

Caution: Handling Instr.: [_____]

| General | CFR49 | IATA | Toxicity |

Compounds

Toxicity

LD50
- Route ▾ Animal [  ] Amount [  ] mg/kg
- Route ▾ Animal [  ] Amount [  ] mg/kg
- Route ▾ Animal [  ] Amount [  ] mg/kg LC50
- Animal [  ] Amount [  ] mg/L/h  g/m*3/h  Amount(convert) [  ]

| ID | REQDATE | SHIPDATE | CLASSIF | AMShip | METHOD | Air | SHIPTONAME | SHIPTOCITY |
|---|---|---|---|---|---|---|---|---|
| 8329 | 12/9/95 | | No | No | AIRBORNE | Yes | -------- | SAN JOSE |
| 8139 | 10/26/95 | | Yes | No | WEST'S DURHA | No | | |
| 8344 | 3/26/96 | | No | No | WELLCOME | No | -------- | BOSTON |
| 8343 | 3/26/96 | | No | No | WELLCOME | No | -------- | HAYS |
| 8342 | 3/26/96 | | No | No | WELLCOME | No | -------- | SAN JOSE |

Not Scheduled

Refresh ~300

310

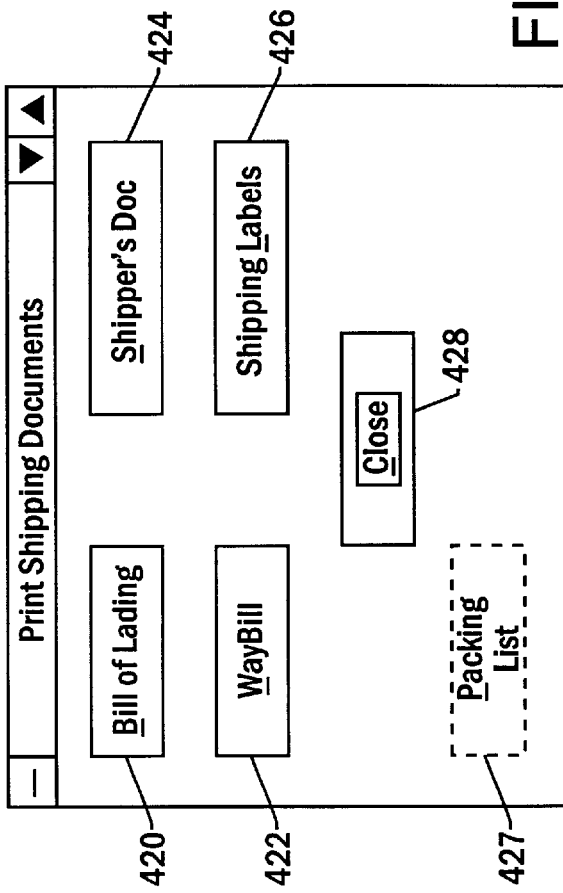

HAZARDOUS MATERIAL CLASSIFICATION SYSTEM

FIELD OF THE PRESENT INVENTION

The present invention relates generally to transportation and regulatory compliance of compounds and other materials. More particularly, the invention relates to a system and method to classify and provide the specifications, documentation and instructions to properly process, package and transport regulated and non-regulated materials.

BACKGROUND OF THE INVENTION

Generation and use of hazardous materials and/or substances in the United States has grown steadily in the last 45 years and is now estimated to be about 270 million metric tons per year. According to one definition, a "hazardous substance" is any substance or mixture of substances that may cause substantial personal injury or substantial illness during or as a proximate result of any customary or reasonably foreseeable handling or use, including reasonably foreseeable ingestion by children, if the substance: (1) is a toxic agent or reproductive toxin; (2) is corrosive; (3) is an irritant; (4) is a strong sensitizer; (5) is flammable, combustible or explosive; (6) is pyrophoric; (7) is a carcinogen, hepatoxin, neprotixin or neurotoxin; (8) is an agent that acts on the hematopoietic system; (9) is an agent that damages the lungs, skin, eyes or mucous membranes; (10) is a compressed gas; (11) is an organic peroxide; (12) is an oxidizer; (13) is unstable, reactive or water-reactive; (14) generates pressure through decomposition, heat or other means; (15) is sufficiently radioactive to require labeling as such; (16) is a toy or other article intended for use by children and presents an electrical, mechanical or thermal hazard; or (17) is specially listed as a hazardous substance by a state or federal agency having jurisdiction over such substances.

Monitoring or tracking of the receipt, handling and disposition of hazardous materials in the workplace is now standard in most businesses that handle one or more such materials. Such tracking often requires submission of prescribed reports to an appropriate federal, state or local agency that monitors compliance with the workplace standards. Many software packages and associated protocols deal with individual or narrowly defined groups of tasks, such as preparation and promulgation of Materials Safety Data Statements (MSDS), monitoring of accumulation and disposal of hazardous wastes, and the like. These packages do not, however, offer an integrated package that addresses classifying, packaging and transporting regulated materials and/or substances.

There are numerous federal mandates relating to the use, handling and/or transportation of hazardous materials. Illustrative are the following.

The Toxic Substances Control Act ("TSCA"), originally passed in 1965, together with the Federal Hazardous Substances Act ("FHSA"), passed in 1966, and the Resource Recovery Act ("RRA"), passed in 1970, were the initial federal laws governing generation and handling of toxic and other hazardous materials. Under TSCA, the Environmental Protection Agency ("E.P.A.") is responsible for reviewing any chemical substance that is or will be produced in sufficient quantity that it may cause significant acute or chronic human exposure. Testing is performed with respect to human health and the environment and focuses particularly on possible risk of serious harm to humans from (i) cancer, (ii) genetic mutations and (iii) birth defects.

If the EPA finds that the risk to human health or to the environment is sufficiently great, the E.P.A. may: (i) limit the amount of the chemical to be manufactured or used; (ii) prohibit a particular use; (iii) require placement of warning labels on all containers of the chemical; (iv) require placement of public notices of use; and (v) regulate commercial use and/or disposal of the chemical.

Any person, including a company, that manufactures or imports more than 10,000 pounds or more of a chemical named on an E.P.A. Chemical Substances Inventory List is subject to the reporting requirements under TSCA. These reporting requirements include: (i) updating of a list of all chemicals present on a site, at four-year intervals or more frequently; (ii) submission (to the E.P.A.) of a Premanufacture Notice and relevant test data for any new chemical, at least 90 days before manufacturing or importing the chemical; (iii) submission of a Notice Of Intent To Import or To Export a listed chemical, within seven days after entering into a contract to import or export the chemical, if the chemical is known to be mutagenic, teratogenic or carcinogenic or is known to cause chronic health or environmental problems; (iv) reporting of a significant new use for a chemical already on the E.P.A. list; (v) reporting of known significant adverse reactions caused by handling or discharge of any chemical used by the reporting entity; (vi) submission of any unpublished health and/or safety studies on certain chemicals used by the reporting entity; (vii) notification of any substantial risk of injury to human health or the environment, due within 15 days after the reporting entity first receives information on the risk; (viii) submission of information on production of, use of and exposure to certain chemicals to an Interagency Testing Committee for analysis by the Committee; (xi) submission of specified comprehensive information on a fixed format reporting form; (x) submission of results of test, if any, performed by the reporting entity on certain heptahalogenated dibenzo-p-dioxins and dibenzofurans, within 90 days after a test, if a positive result is obtained; and (xi) submission of a Notification of PCB Activity form by any storer, transporter or disposer of polychlorinated biphenyl ("PCB") waste. TSCA also sets forth certain requirements for labeling of, disposal of and recordkeeping for certain chemicals, such as PCBs.

The Hazardous Materials Transportation Act ("HMTA"), passed in 1974, is administered jointly by the Department of Transportation ("D.O.T."), established in 1966, and the E.P.A., established in 1969. The HMTA sets forth 15 "hazard classes" of hazardous materials (e.g., flammable liquids, high explosives, poisons), plus five classes of "other regulated materials," and sets forth laws and corresponding regulations relating to: (i) identification, listing, labeling and placarding of hazardous materials; (ii) recordkeeping requirements for handling hazardous materials, including Uniform Hazardous Material Manifests for shipment of hazardous wastes; (iii) requirements for generators and transporters of hazardous materials and for owners and operators of specially defined treatment, storage and disposal facilities ("TSDFs"); (iv) permit and pre-transport notification requirements and transportation routing for all facilities that generate or transport hazardous materials; (v) requirements for tracking the movement of hazardous materials; (vi) containers to be used for transport; (vii) incident notification and other procedures for handling and reporting accidental and intentional discharges of hazardous materials; and (viii) testing and standards for operators of hazardous material transport vehicles. Under the HMTA, a "generator" of a hazardous waste is defined simply as "any person whose act first causes a hazardous waste to become subject to regulation."

Transportation modes covered under the HMTA include movement of a hazardous material by air, rail, water and highway. The D.O.T. is also authorized to inspect generator and transporter facilities, vehicles and records to insure compliance.

The federal mandates, with their demanding regulatory requirements, have created a need for sophisticated information and transportation management solutions to assist industry and other impacted entities in the compliance process. In recent years, software applications have emerged that attempt to manage selected aspects of compliance, such as MSDS or Hazardous Waste Manifest information. The limited scope of these applications, coupled with the limitations of the software supporting such applications, has led to a plethora of limited solutions.

Several applications have attempted to manage all aspects of environmental compliance by grouping together several mini-applications or modules. However, managing the universe of environmental compliance information requires management of the compliance reports as well as the information from which the compliance reports were prepared. Indeed, in many instances, the information is tightly interrelated. For example, an accidental release of Parathion at a facility where it is manufactured has environmental as well as health and safety consequences. The information that results from the release is critical for the accurate preparation of regulatory agency reports. Invariably, each accident requires reporting to two or more regulatory agencies; each regulatory agency is responsible for a different element of the accident. The noted application packages that claim a "comprehensive" approach do not have the capability of sharing information between different functions from a common information store or managing the information dynamically. The application packages are, in reality, fragmented and offer no synergistic advantages over their component parts.

Inventory management systems currently available tend to be of two varieties. The first variety ignores the packaging and transportation of hazardous materials and most or all effects of, and responsibilities under, the hazardous material laws and regulations. The noted systems merely track the amount of a chemical present in inventory, work-in-process and finished products.

A second variety focuses on a few of the functions of inventory control, manufacturing, waste disposal, etc. and accounts for a few of the applicable hazardous material laws. For example, AV Systems offers a plurality of stand-alone modules for hazardous material reporting. The MSDS+ System from AV Systems is designed for O.S.H.A. Hazards Communications Standard compliance, preparation of MSDSs and the associated warning labels, and tracking of employee training. Form R covers toxic release inventory reporting under SARA Title III and multi-year comparisons for PPA reporting. VOC tracks air permits and emissions. WASTE tracks cradle-to-grave waste handling and reporting. INVENTORY records chemical inventory transactions. A LOCASL module offers compliance procedures for compliance with state and local rules.

Envirogenics CHEM Master provides a database on 4700 of the most commonly used hazardous substances (categorized by substance names) and D.O.T. Emergency Response guidelines; and WASTE db tracks waste materials, provides an historical record of treatment, storage and disposal activities by TSDFs, and prints state-specific waste manifests.

CHEMMIX offers several programs that determine chemical incompatibilities and potential adverse reactions based upon fire, explosion, heat, toxic gas emission, violent polymerization, flammability, etc.

ERM Computer Services' Enflex Data provides 16 separate modules covering facilities description, chemical inventories, SARA Title II Form R reporting, container and permit tracking, and water and air data.

General Research FLOW GEMINI provides hazardous material report generation, using a blank screen on which the user designs the reporting forms to be used. Some standard report forms are included with this software.

Imagetrak software's MSDS ExPress allows scan-in of MSDS images, which are then attached in an unspecified way to a data base record. Information contained on the scannedin MSDSs can then be queried in a simple question and answer format.

J & H Software offers Process Adviser/NPDES Reporter, which allows management of process data for a waste treatment facility, including solids balances, percent removal and statistical analyses of plant operation parameters.

North American Software provides several individual modules for hazardous material management, including: HAZARD Basic Manifest Management System for E.P.A. Uniform Hazardous Waste Manifest tracking; Hazard Basic Waste Tag Management System for report generation based on waste container tags; HAZARD Basic Operation Log Management System for report generation based on activity tags; and HAZARD MSDS Document Management System for creating a database for hazardous material document images.

OSHA-SOFT's Compliance Manager provides a link between MSDSs and chemical inventory information, to facilitate compliance with the O.S.H.A. Hazards Communication Standard.

Alternative Systems, Inc.'s system, described in U.S. Pat. No. 5,726,884, includes eight (8) integrated modules or functional groupings for in-house management, handling and tracking of hazardous materials.

Although the noted software packages appear to afford detailed treatment of hazardous materials, the software packages have numerous drawbacks and disadvantages, including the lack of effective integration by and between the modules and any means of automatic material classification.

It is therefore an object of the present invention to provide a computer-based hazardous material classification and compliance system that provides the material classification, specifications, documentation and instructions to properly process, package and transport regulated and non-regulated materials.

It is another object of the invention to provide a computer-based hazardous material classification and compliance system that includes a classification module that automatically classifies regulated and non-regulated material.

It is another object of the invention to provide a computer-based hazardous material classification and compliance system that includes a scheduling module which facilitates the scheduling of regulated and non-regulated material packaging and transport.

It is another object of the invention to provide a computer-based hazardous material classification and compliance system that generates and archives all records and modifications thereto required under applicable federal and state hazardous substance laws.

It is another object of the invention to provide a computer-based hazardous material classification and compliance system that includes a self-auditing function.

It is yet another object of the invention to provide a computer-based hazardous material classification and compliance system that includes an emergenicy response function for identification, tracking and handling of hazardous substances.

SUMMARY OF THE INVENTION

In accordance with the above objects and those that will be mentioned and will become apparent below, the Hazardous Material Classification and Compliance System, in accordance with this invention comprises a computer system having processing means, data storage means, display means and input means; first prompting means, for prompting on said display means for user entry via said input means, and for storing in said data storage means, the identity and history of information corresponding to an originator of a request for material; second prompting means, for prompting on said display means for user entry via said input means, and for storing in said data storage means, the identity and history information corresponding to a recipient of said material; third prompting means, for prompting on said display means for user entry via said input means, and for storing in said data storage means, the properties and characteristics of said material; classification means responsive to said material properties and characteristics for classifying said material, and for storing said material classification in said data storage means; fourth prompting means, for prompting on said display means for user entry via said input means, and for storing in said data storage means, a packaging and shipping schedule for said material; and fifth prompting means, for prompting on said display means for user entry via said input means, and for storing in said data storage means, the packaging materials required for transport of said material.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIGS. 9, 9A, 9B, 9C, 9D, 9E, 9F, 10, 11, 12, 13, 14, 15, 16, 17, 18, 19, 20, 21, 22, 23, 24, 25, 26, 27, 28, and 29 illustrate display screens which are presented to a user and demonstrate the operational logic of the Hazardous Material Classification and Compliance System, according to the invention.

DETAILED DESCRIPTION OF THE PREFERRED EMBODIMENT

The hazardous material classification and compliance system ("HazClass") of the present invention substantially reduces or eliminates the disadvantages associated with prior art hazardous material handling systems. According to the invention, HazClass provides material classification, specification, documentation and instructions to properly process, package and transport regulated hazardous materials and non-regulated materials.

By the term "hazardous material," as used herein, it is meant to mean any material or substance, including mixtures and solutions thereof, which has been determined by the Secretary of Transportation to be capable of posing an unreasonable risk to health, safety, and property when transported in commerce and includes, but is not limited to, hazardous substances, hazardous wastes, marine pollutants, elevated temperature materials as defined in 49 C.F.R. §§ 106–180, and materials designated as hazardous and/or meet the defining criteria for hazardous classes and divisions under the provisions of 49 C.F.R. §§ 106–180.

Figure 1:
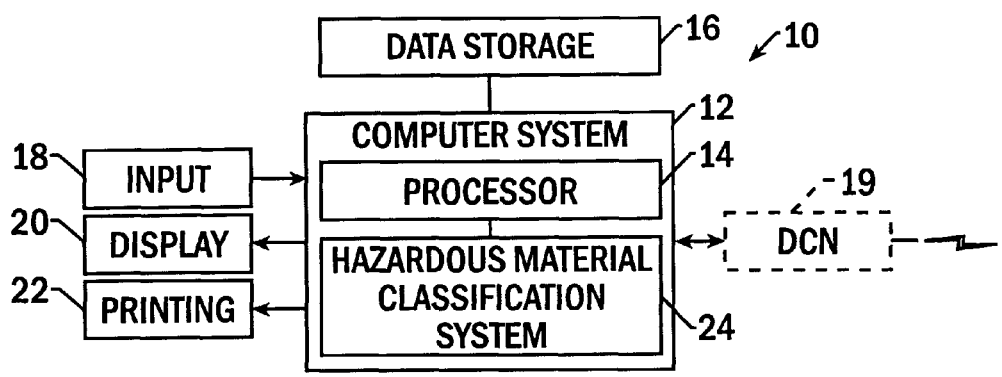
FIG. 1 is a block diagram of the computer-based Hazardous Material Classification and Compliance System, according to the invention.

Referring first to FIG. 1, there is shown a general overview of a computer-based hazardous material classification and compliance system 10 according t6 the invention. The system 10 includes a computer system 12 having processor means 14.

As illustrated in FIG. 1, the computer system 12 is operated and connected to data storage means 16. In addition, the computer system 12 is also connected to several input/output peripheral devices, including input means 18, display means 20 and printing means 22. In additional envisioned embodiments, the computer system 12 is also connected to a digital communications network 19 (shown in phantom), which enables inputting and outputting of data over the internet.

According to the invention, input means 18 may comprise a keyboard, mouse, virtual track ball, light pen, or any other number of devices, individually or collectively, used for entering data or selecting options in computing environments. Display means 20 may comprise a color cathode ray tube, or any other type of display device. Finally, printing means 22 may be a laser printer, or any other type of printing device.

Processor means 14 preferably comprises a personal computer (i.e., PC). The processor means 14 communicates with input device 18, display device 20, printing device 22 and data storage device 16. Data storage means 16 may comprise a hard disk drive, tape, etc., or any combination thereof.

The computer system 12 also contains the hazardous material classification and compliance system or "HazClass" 24. According to the invention, HazClass 24 is preferably implemented as a stored program which communicates with and executes on processor 14.

Figure 9:
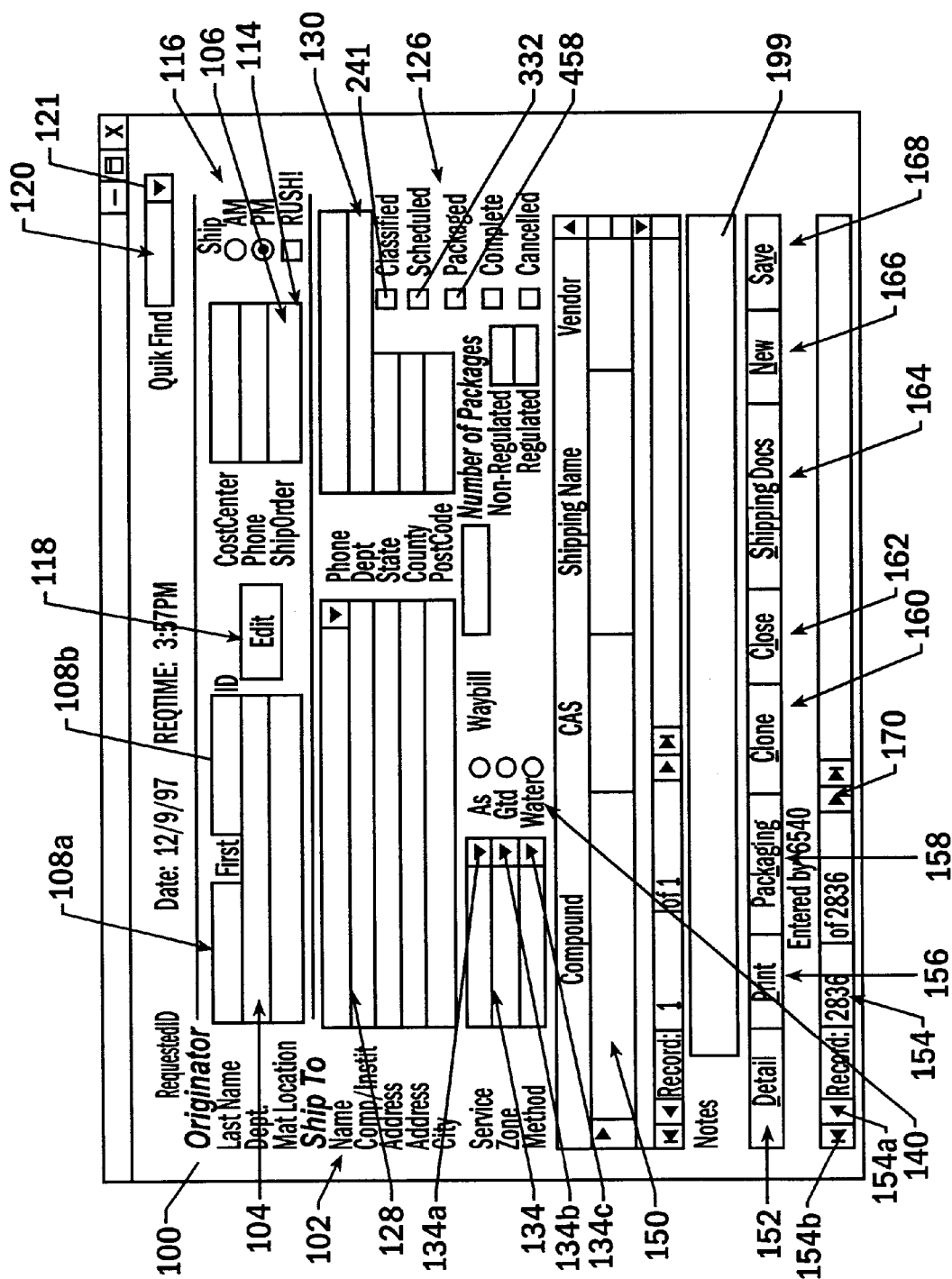
Figure 9A:
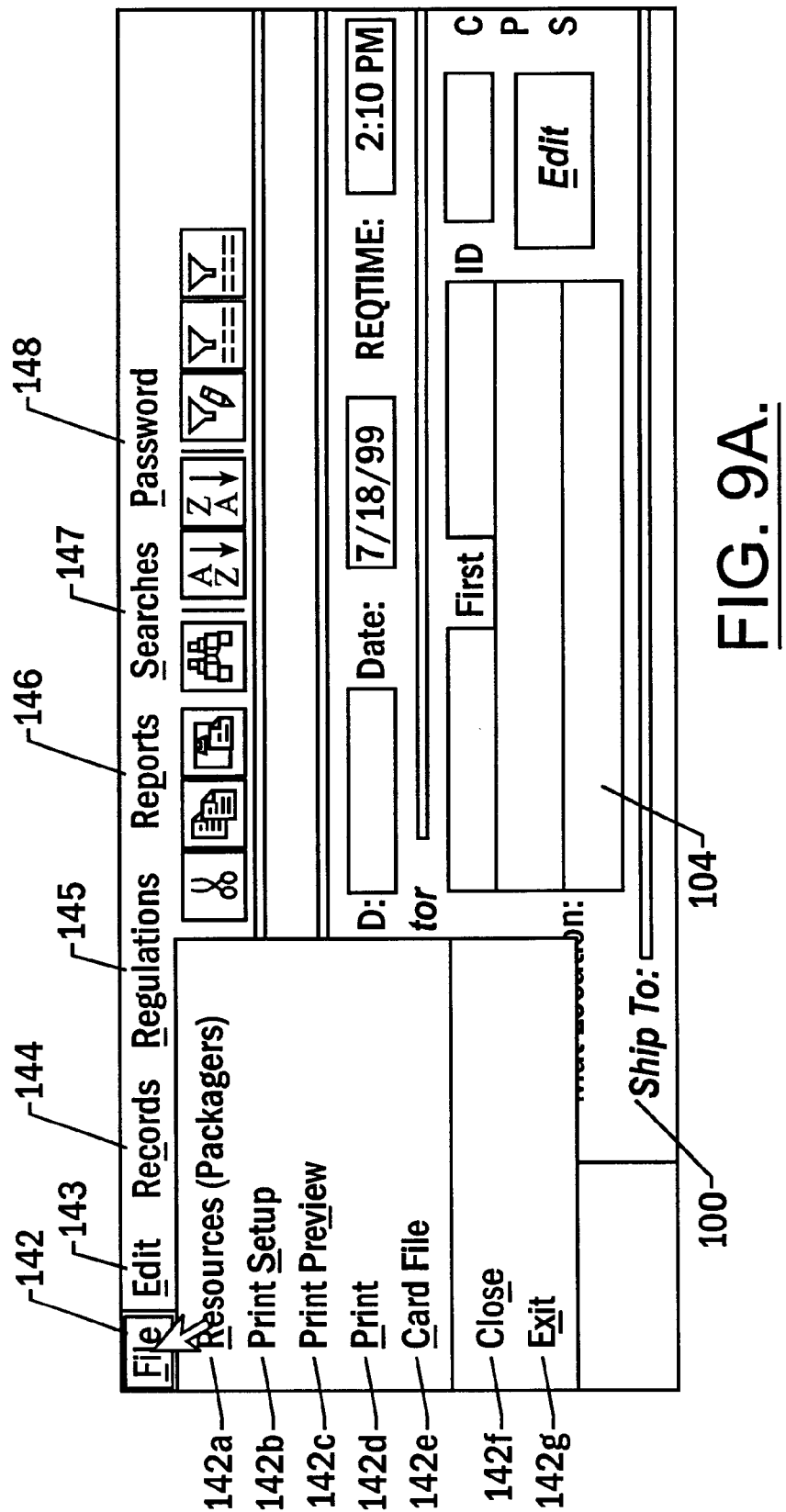

Since HazClass 24 is implemented in a Windows' environment, as illustrated in FIGS. 9A–9F, HazClass 24 also includes a number of pull-down menus, including "file" 142, "edit" 143, "records" 144, "regulations" 145, "reports" 146, "searches" 147, and "authorizations" 148. Referring to FIG. 9A, selecting the "File" pull-down menu 142 provides the user with the following options: "Resources" 142a (discussed in detail below), "Print Setup" 142b, "Print Preview" 142c, "Print" 142d, "CardFile" 142e (discussed in detail below), "Close" 142f and "Exit" 142g.

Figure 9B:
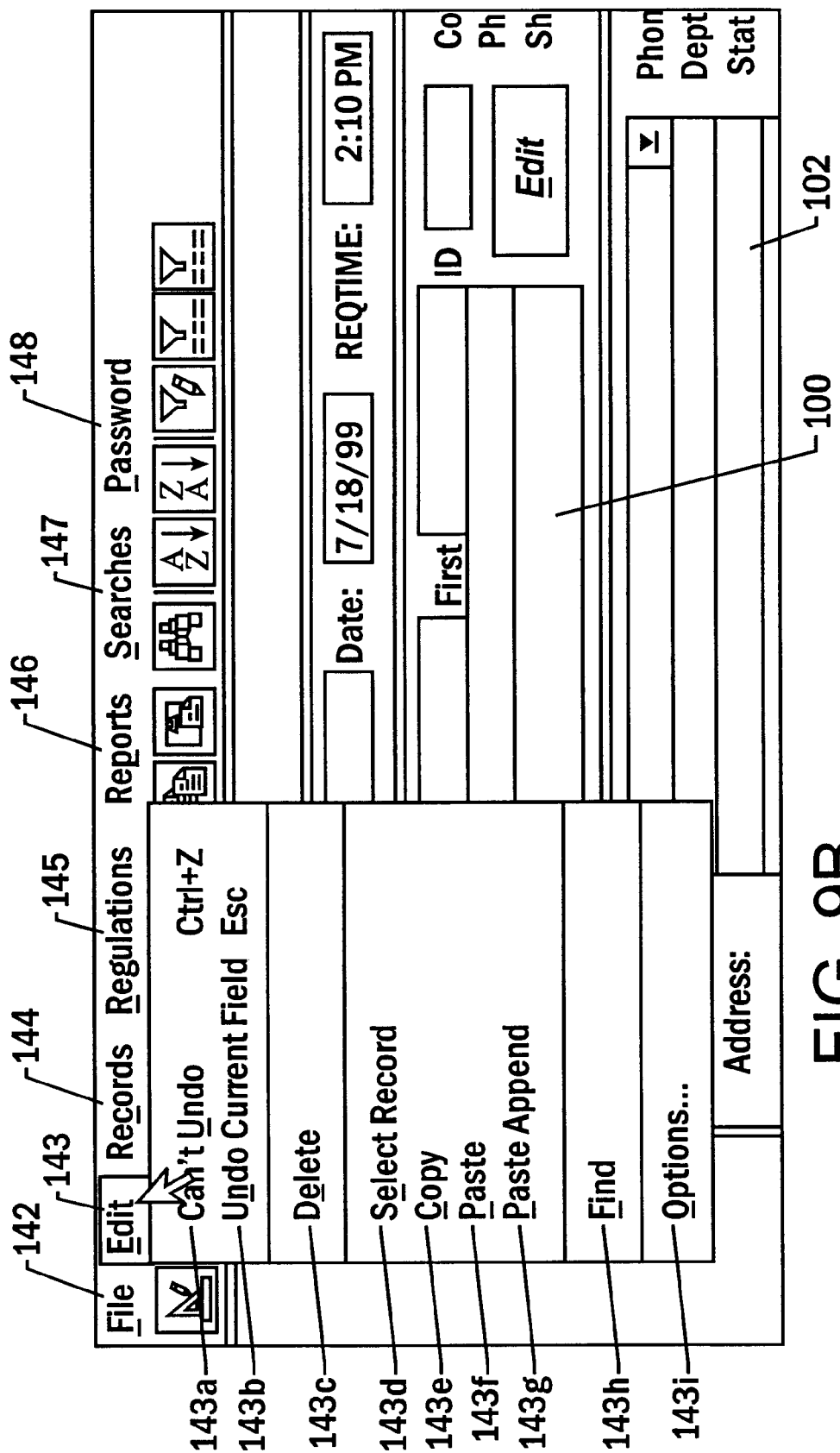

Referring to FIG. 9B, selecting the "Edit" pull-down menu 143 provides the user with the following options: "Can't Undo" 143a, "Undo Current Field" 143b, "Delete" 143c, "Select Record" 143d, "Copy" 143e, "Paste" 143f, "Paste Append" 143g, "Find" 143h and "Options" 143i.

Figure 9C:
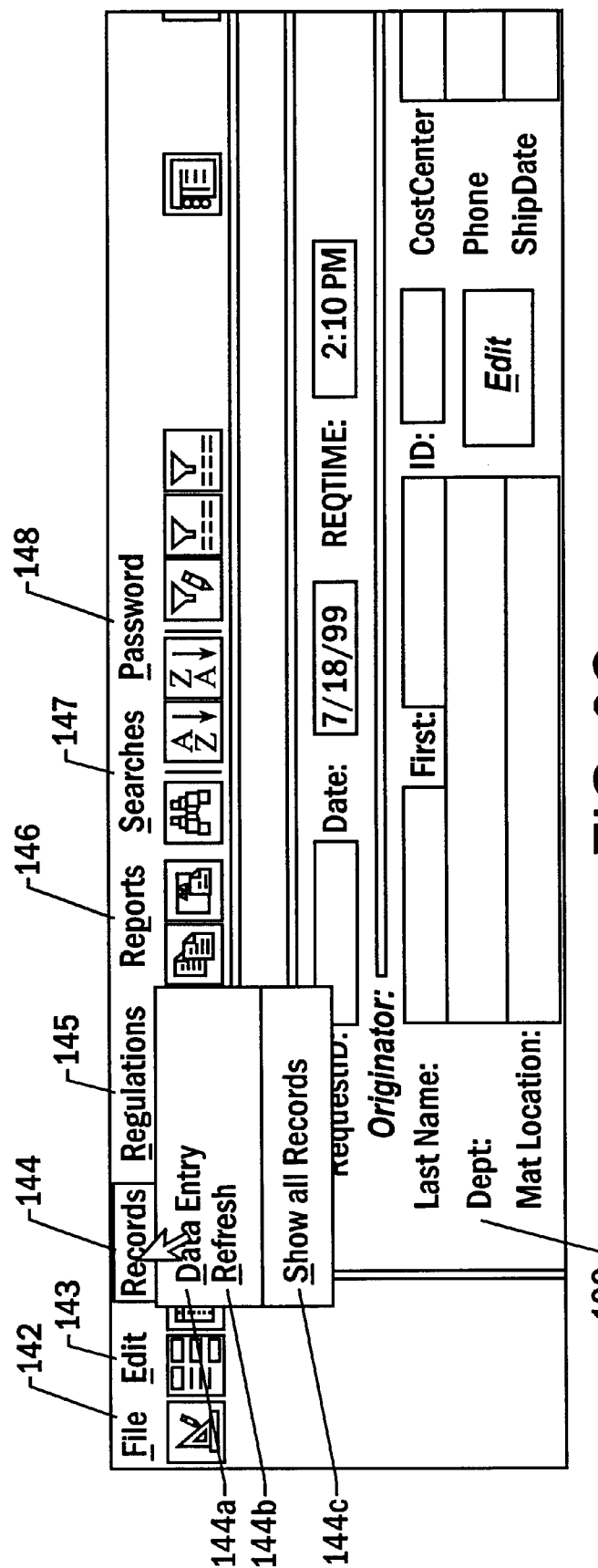

Referring to FIG. 9C, selecting the "Records" pull-down menu 144 provides the user with the following options: "DataEntry" 144a, "Refresh" 144b (discussed in detail below) and "Show All Records" 144c.

Figure 9D:
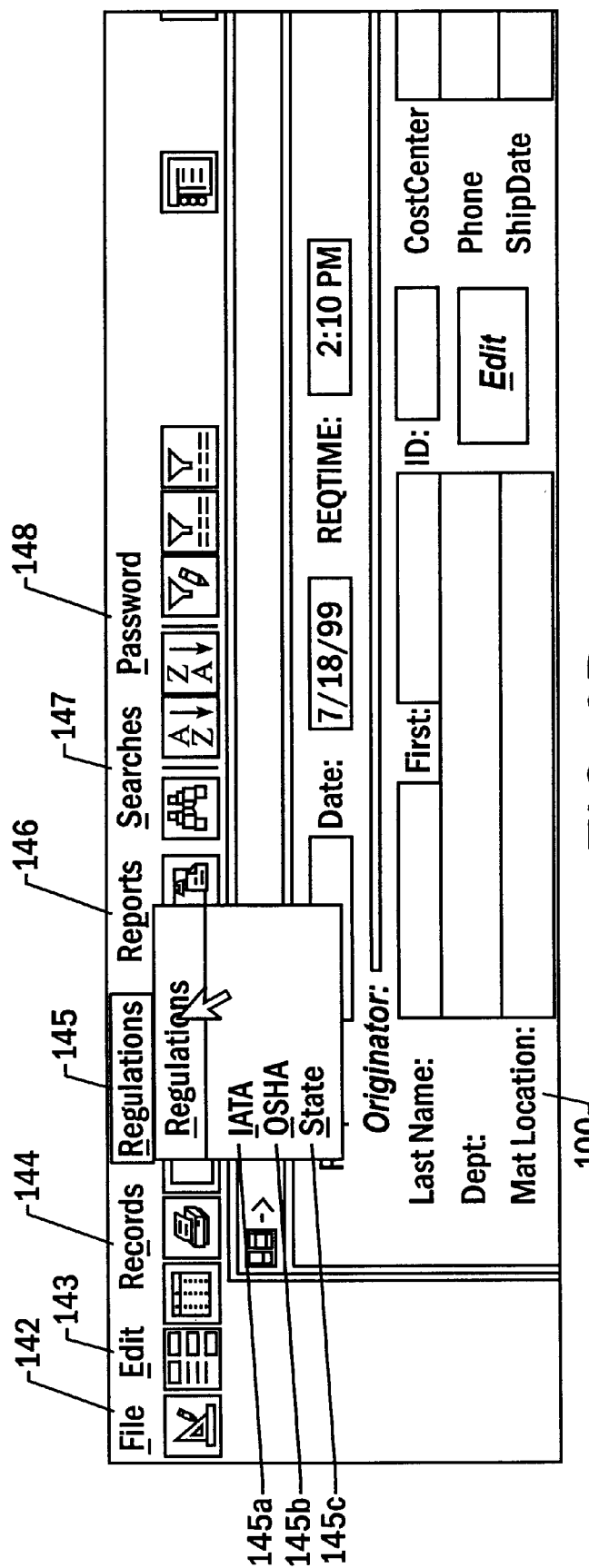

Referring to FIG. 9D, selecting the "Regulations" pull-down menu 145 provides the user with access to the following regulations: "IATA" 145a, "OSILA" 145b and "State" 145c.

Figure 9E:
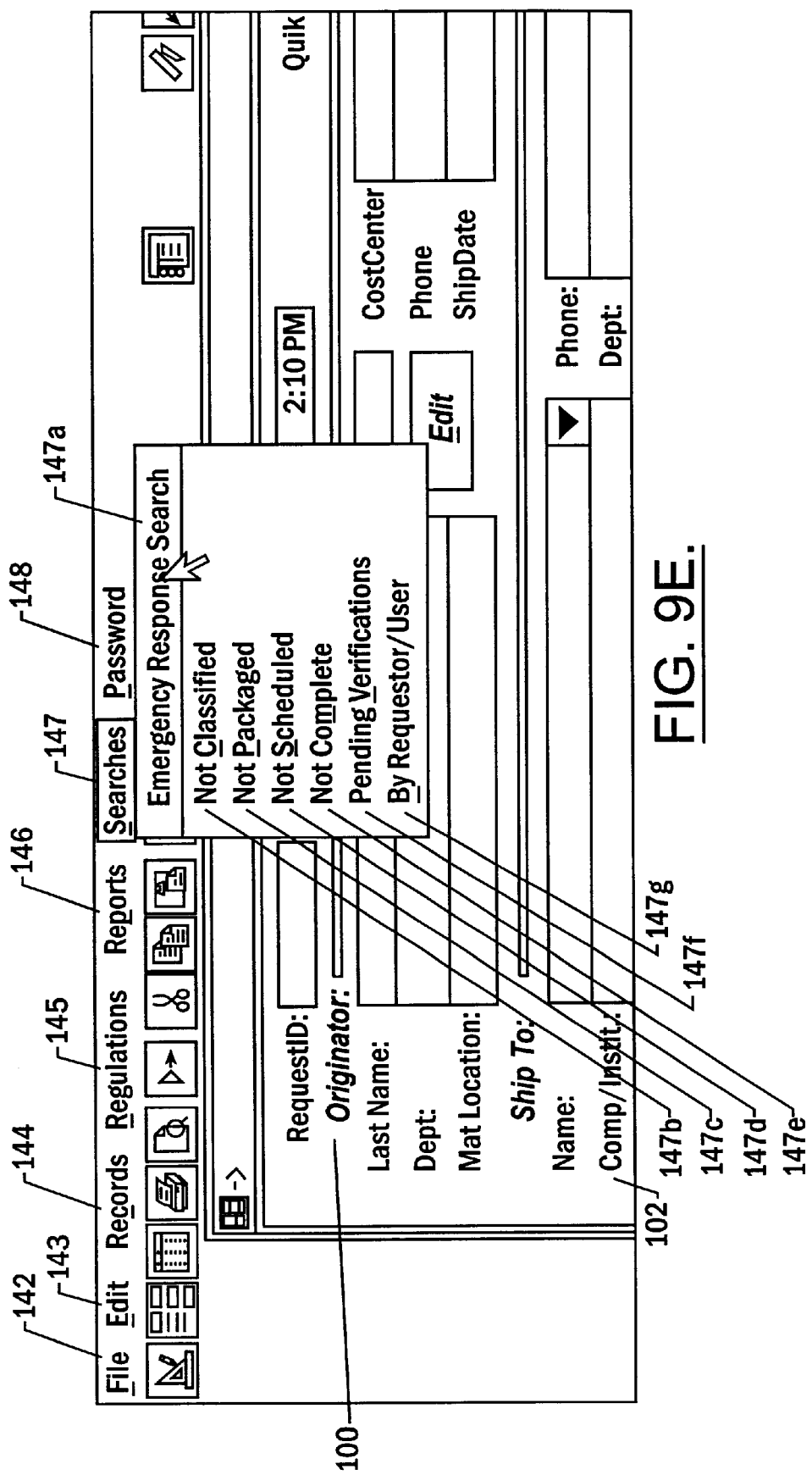

Referring to FIG. 9E, selecting the "Searches" pull-down menu 147 provides the user with the following options: "Emergency Response Search" 147a, "Not Classified" 147b, "Not Packaged" 147c, "Not Scheduled" 147d, "Not Complete" 147e, "Pending Verifications" 147f and "By Requestor/User" 147g. Each of the noted "Searches" options is discussed in detail below.

Figure 9F:
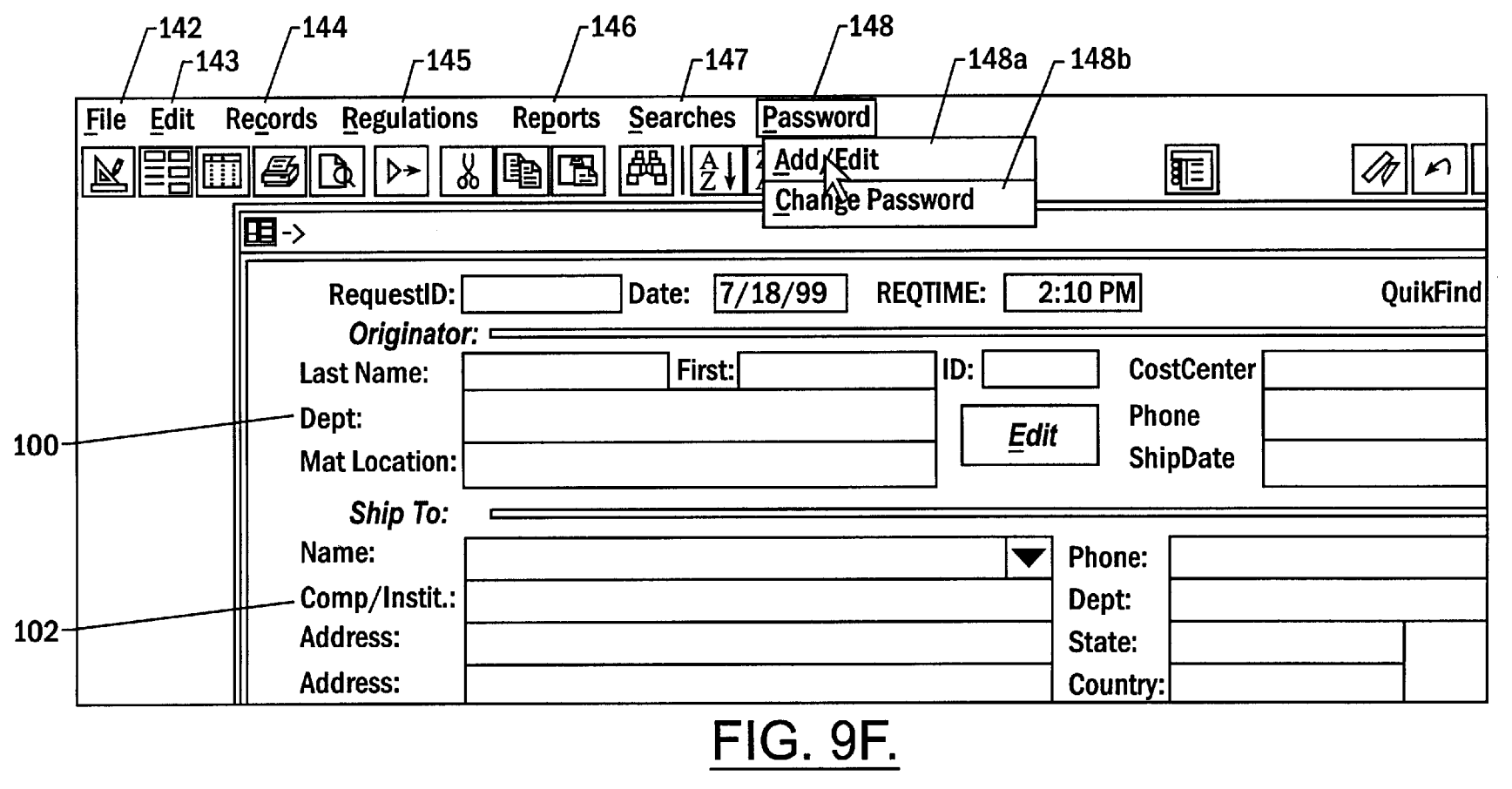

Referring to FIG. 9F, selecting the "Password" pull-down menu 148 provides the user with the following options: "Add/Edit" 148a and "Change Password" 148b.

Figure 2:
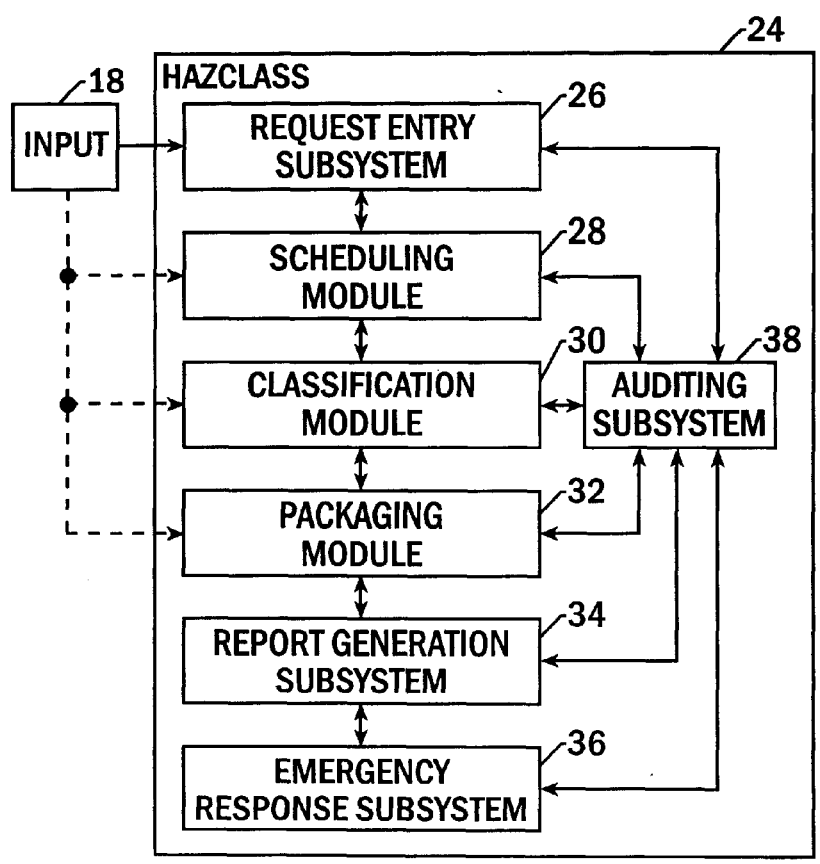
FIG. 2 is a block diagram of the Hazardous Material Classification and Compliance System referred to in FIG. 1, according to the invention.

Referring now to FIG. 2, there is shown a block diagram of HazClass 24. In a preferred embodiment, HazClass 24 includes three primary modules: scheduling 28, classification 30 and packaging 32. HazClass 24 also includes subsystems for request entry 26, report generation 34, emergency response 36 and auditing 38.

According to the invention, HazClass 24 is event controlled. Thus, processing of regulated (and non-regulated) material can commence via the request entry subsystem 26 or at any primary HazClass module 28, 30, 32. In a preferred embodiment, processing commences via the request entry subsystem 26.

The components of HazClass 24 will now be described generally in conjunction with the process control flow chart shown in FIG. 3. A detail description of the HazClass modules 28, 30, 32 is set forth below in the section labeled "Detailed Operations of HazClass."

Figure 3A:
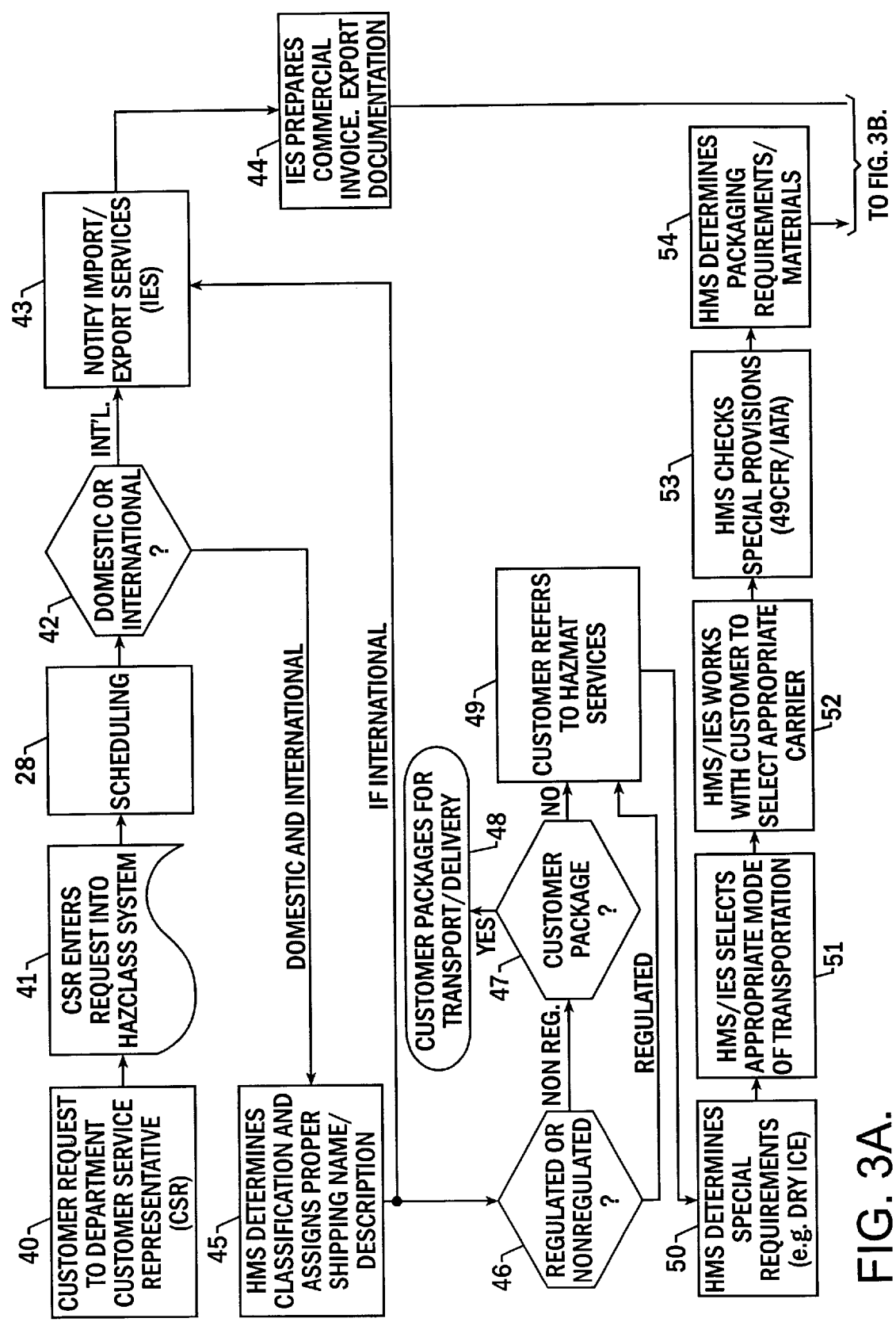
FIG. 3 is a flow chart illustrating the operational control of the Hazardous Material Classification and Compliance System illustrated in FIG. 2.
Figure 3B:
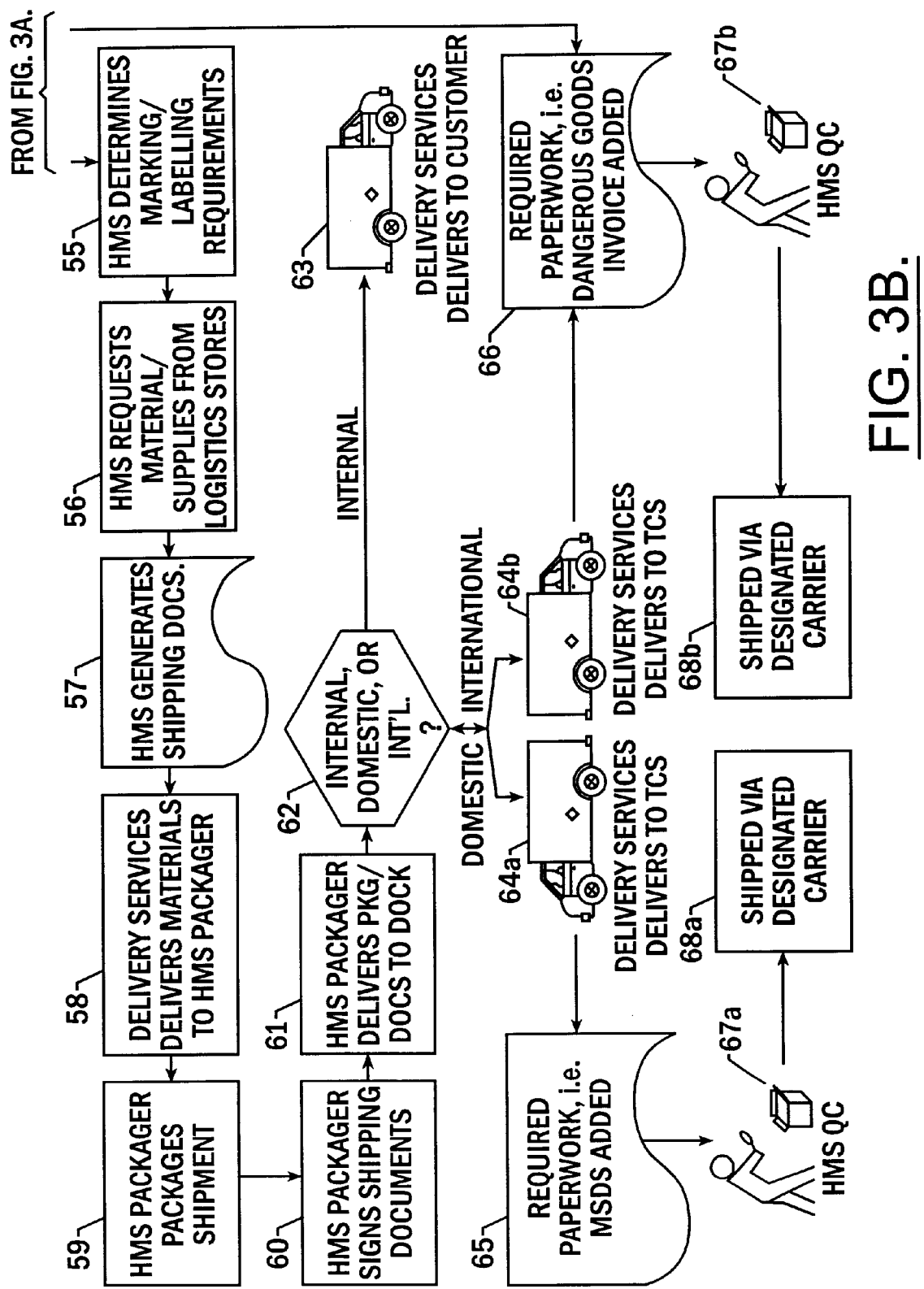

The process control and/or system flow chart shown in FIG. 3 illustrates the incorporation of and, hence, material processing control resulting from HazClass 24 in a typical material handling or process control system. As will be appreciated by one having skill in the art, HazClass 24 can be readily incorporated into virtually all existing process control systems. It will be further understood by those having skill in the art that flow charts, such as that shown in FIG. 3, may be implemented by computer system 12.

Processing of a material request typically commences upon receipt of a customer material request 40. The HazClass operator or user initiates the request entry subsystem 26 and enters the request 41 into HazClass 24 via input device 18.

As discussed in detail below, if information regarding the customer (or originator) is contained in the data storage device 16 (i.e., HazClass database), the request entry subsystem 26 will automatically display the existing customer information via display device 20. A determination is then made if the customer information is current and/or accurate.

If a new customer is to be entered into HazClass 24 or existing customer information is to be updated, the user enters the information via input device 18, which is stored in data storage device 16.

After entry of the material request, scheduling module 28 is preferably initiated. However, since HazClass 24 is event controlled, the user may defer initiating the scheduling module 28 until after classification is completed via classification module 30.

Figure 4:
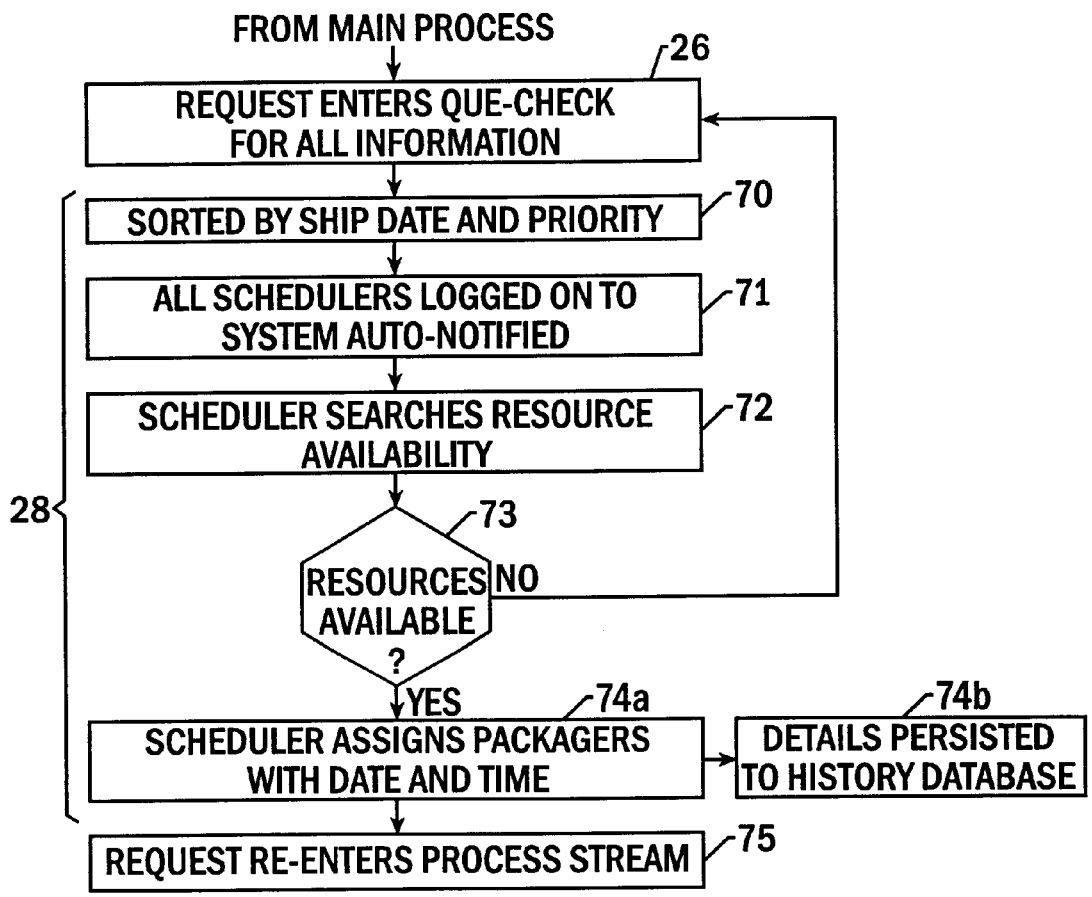
FIG. 4 is a flow chart of the scheduling module of the Hazardous Material Classification and Compliance System, according to the invention.

If scheduling module 28 is initiated by the user, the customer request is sorted by ship date and priority 70 (See FIG. 4). A determination is then made if the necessary resources are available (e.g., packaging materials) 72. The scheduling module 28 then provides the scheduled dates and times to designated operators (e.g., "Packagers") 74a.

HazClass 24 then prompts the user to enter the point of delivery 42, i.e., domestic or international. The classification module 30 is then initiated by the user 45. As discussed in detail below, the classification module 30 provides the appropriate material classification and shipping name/description.

If the mode of transportation is international, the user notifies Import/Export Services (IES) 43. IES prepares the commercial invoice/export documentation 44 and any additional required paperwork 66.

If the mode of transportation is domestic, HazClass 24 prompts the user to indicate whether the material is regulated or non-regulated 46. If the material is non-regulated, HazClass 24 prompts the user to indicate if packaging will be accomplished by the customer 47. If so, the customer packages the non-regulated material for transport 48.

If the material is regulated or packaging is not to be accomplished by the customer, the packaging module 32 of HazClass 24 prompts the user to indicate special packaging requirements (e.g., dry ice) 50 and the mode of transportation 51. The user then works with the customer to select an appropriate carrier 52. The user also checks the applicable regulatory provisions 53 and, subsequently, determines the appropriate packaging requirements/materials 54.

The labeling component (or subsystem) 55 of the packaging module 32 is then initiated by the user. The labeling component 55 determines the appropriate marking/labeling requirements and provides the required labels.

The packaging module 32 of HazClass 24 then prompts the user (i.e., assigned "Packager") to provide the necessary packaging materials and supplies 56. The packaging module 32 also generates the appropriate shipping documents 57.

Delivery services delivers the material to the assigned "Packager" 58, who packages the material for shipment 59, signs the shipping documents 60 and delivers the packaged material and documents to the shipping dock 61. If the material is to be delivered internally (i.e., within the facility), delivery services delivers the material directly to the customer 63.

If the material is to be delivered domestically or internationally, delivery services initially delivers the material to Hazardous Material Services 64a, 64b where the required documentation is completed 65, 66. The material is then inspected by quality control 57a, 57b and shipped via the designated carrier 68a, 68b.

If a determination is made after packaging is complete 59 that a report is to be generated, the user can initiate the report generation subsystem 34 to generate multiple reports, including metrics, invoice-cost analysis, accounting, emergency information, manpower and utilization, supplies usage, history and tracking, and auditing.

DETAILED DESCRIPTION OF HAZCLASS MODULES

As illustrated in FIG. 2, HazClass 24 includes three, inter-related primary modules: scheduling 28, classification 30 and packaging 32. Access to each module 28, 30, 32 is, however, restricted to "authorized" users.

According to the invention, each "authorized" user is provided with a HazClass ID and assigned to a HazClass user group. The user groups comprise the following: Primary Users, Classifiers, Schedulers and Packagers.

With exception of the users assigned to the "primary users group" (e.g., supervisory personnel), each group is restricted to a respective aspect or module of HazClass 24 (e.g., "classification 35") via the HazClass security component. Accordingly, a user assigned to the "Schedulers group" is not authorized to classify material and, hence, is not provided access to the classification module 35 of HazClass 24. If the user is assigned to the "Classifiers group," the user is solely provided access to the classification module 35. In this manner, only those users with the necessary training and skill are provided access to their respective area(s) of training and expertise.

All activities accomplished by the users, user groups, HazClass modules and subsystems are also monitored and recorded in data storage device 16 (i.e., HazClass database log files). Such activities include: (i) the name of the user, user group, and time/date of login and logout, (ii) modifications or revisions made, with prior values/information recorded, (iii) length of time to complete any modifications or revisions, (iv) statistics on time to package, time to classify, time to schedule, and time to complete, and (v) authorization and training level of user, with checks for currency of training.

Additional details regarding the HazClass security component are set forth below in the section entitled "Detailed Operation of HazClass."

Scheduling Module

Referring now to FIG. 4, there is shown a flow chart of the scheduling module 26 of HazClass 24. As indicated above, during implementation of the scheduling module 26, which can only be initiated by an authorized user (i.e., "Scheduler"), the scheduling module 26 sorts each material request by ship date and priority 70. The scheduling module 26 also automatically notifies all "Schedulers" logged on to HazClass 24.

The scheduling module 26 then provides a list of available personnel and their respective assignments to assist the "Scheduler" in determining resource availability 72. If the resources are not available, the scheduling module 26 refers the Scheduler back to the request entry subsystem 26 of HazClass 24.

If the resources are available, the Scheduler assigns the "Packagers" with the scheduled date and time 74a. The scheduling information is then entered into the HazClass database 74b and the request re-entered into the process steam 75.

Classification Module

Figure 5:
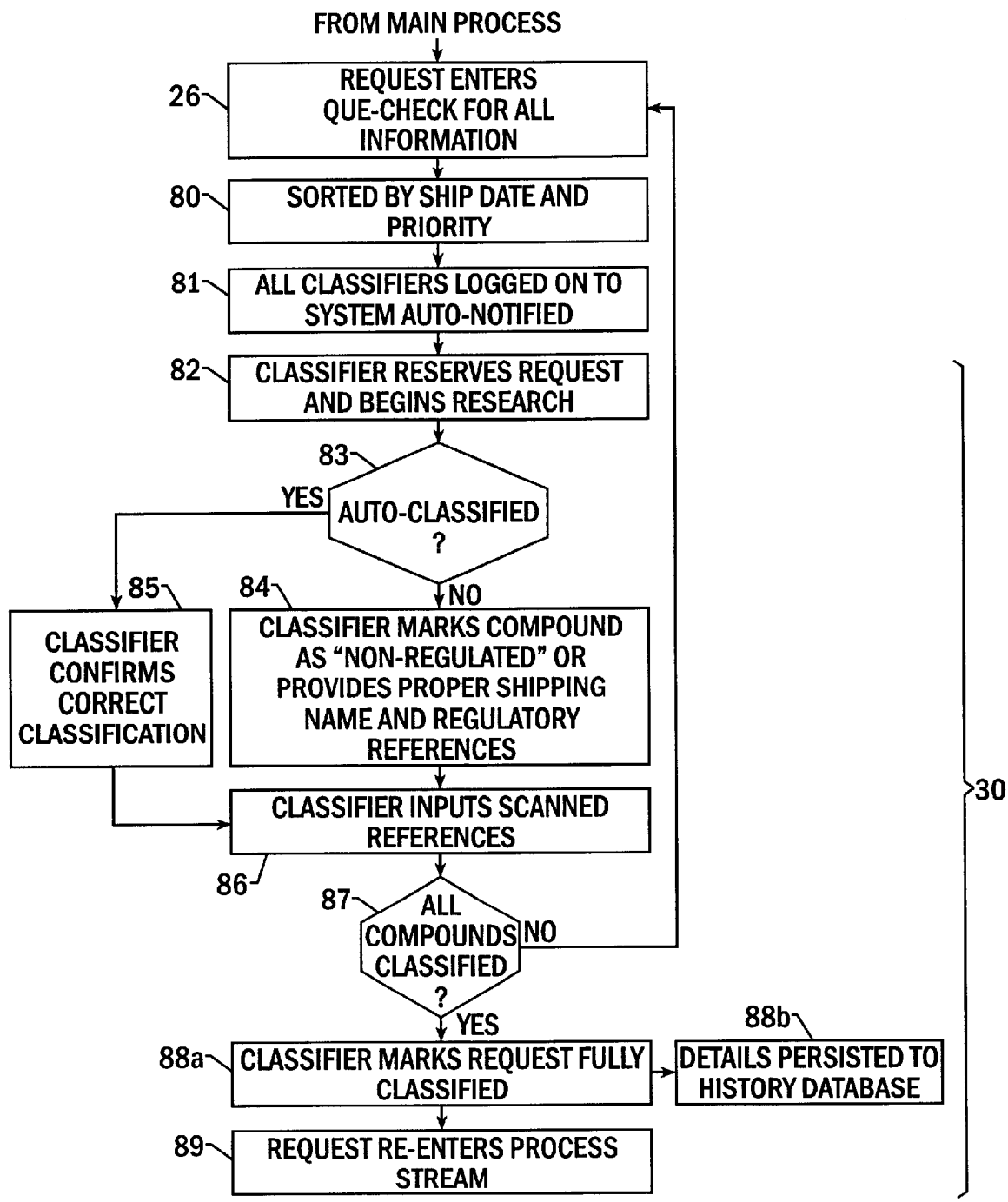
FIG. 5 is a flow chart of the classification module of the Hazardous Material Classification and Compliance System, according to the invention.

Referring now to FIG. 5, there is shown a flow chart of the classification module 30 of HazClass 24. As discussed, the customer material request is initially entered into HazClass 24 via request entry subsystem 26.

The authorized "Classifier" then enters his/her ID to initiate the classification module 30. The classification module 30 then sorts the material request(s) by ship date and priority 80. The classification module 30 also notifies all "Classifiers" logged on the HazClass 24.

HazClass 24 then prompts the Classifier to enter the material (or compound), sender, catalog number and compound code (CAS) 82. According to the invention, if at least two (2) of the noted variables correspond to information stored in the data storage device 16 or HazClass database, the classification module 30 will automatically classify the material 83. If the material is automatically classified via the classification module 30, the Classifier then merely confirms that the classification is correct 85. The Classifier then inputs the scanned references 86, confirming the correct classification.

If the material is not automatically classified, the Classifier indicates that the material is non-regulated or provides the proper shipping name, pertinent material characteristics and/or properties and regulatory references 84, as prompted by the classification module 30. The regulatory references are similarly entered 86 via the classification module 30.

The classification module 30 of HazClass 24 then prompts the Classifier to indicate if all materials in the request have been classified 87. If all the materials have not been classified, HazClass 24 refers the Classifier to the request entry subsystem 26 of HazClass 24.

If all materials have been classified, HazClass 24 prompts the Classifier to confirm that all materials in the request have been classified 88a. The classification is then entered into the HazClass database 88b and the request re-entered into the process stream 89.

Packaging Module

Figure 6:
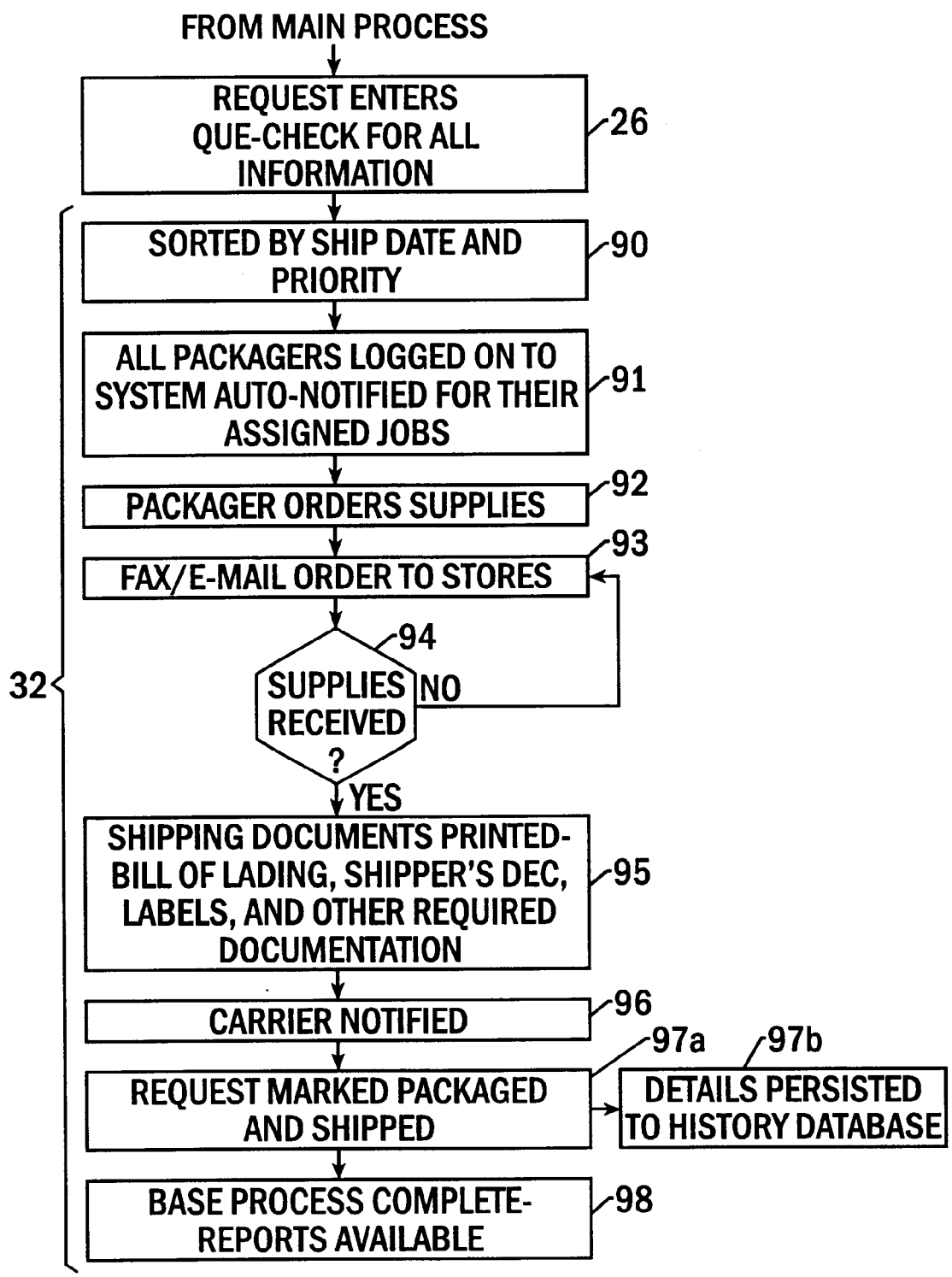
FIG. 6 is a flow chart of the packaging module of the Hazardous Material Classification and Compliance System, according to the invention.

Referring now to FIG. 6, there is shown a flow chart of the packaging module 32 of HazClass. The customer material request is initially entered via request entry subsystem 26.

The authorized "Packager" then enters his/her ID to initiate the packaging module 32. The packaging module 32 then sorts the material request(s) by ship date and priority 90. The packaging module 32 also notifies all "Packagers" logged on to HazClass 24.

The packaging module 32 then prompts the Packager to enter the supplies/materials to be ordered 92. The order is then forwarded to a designated supply outlet via fax/email 94.

A determination is made if the supplies have been received 94. If the supplies have not been received, the packaging module 32 prompts the Packager to review the supply order. If the supplies have been received, the packaging module 32 determines and provides the if requisite shipping documents (i.e., bill of lading, labels, etc.) 95. The selected carrier is then notified 96.

The packaging module 32 then prompts the Packager to indicate that the requested material has been packaged and shipped 97a. The packaging and marking information is then stored in the HazClass database 97b.

Upon completion of packaging, the report generation subsystem 34 can be initiated to generate a selected report 98.

Conceptual and Physical Data Models

Figure 7A:
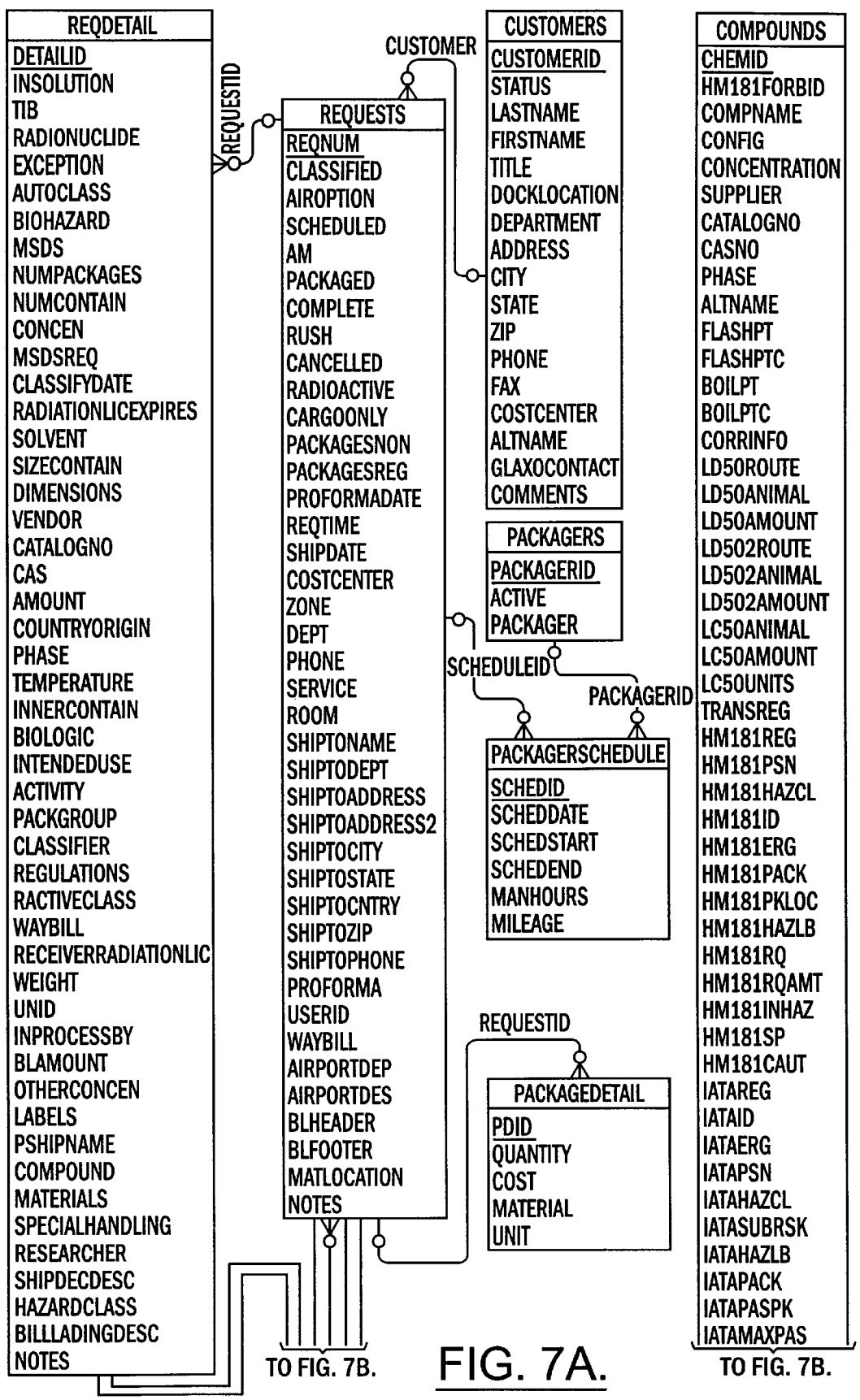
FIG. 7 is a conceptual model of the Hazardous Material Classification and Compliance System, according to the invention.
Figure 7B:
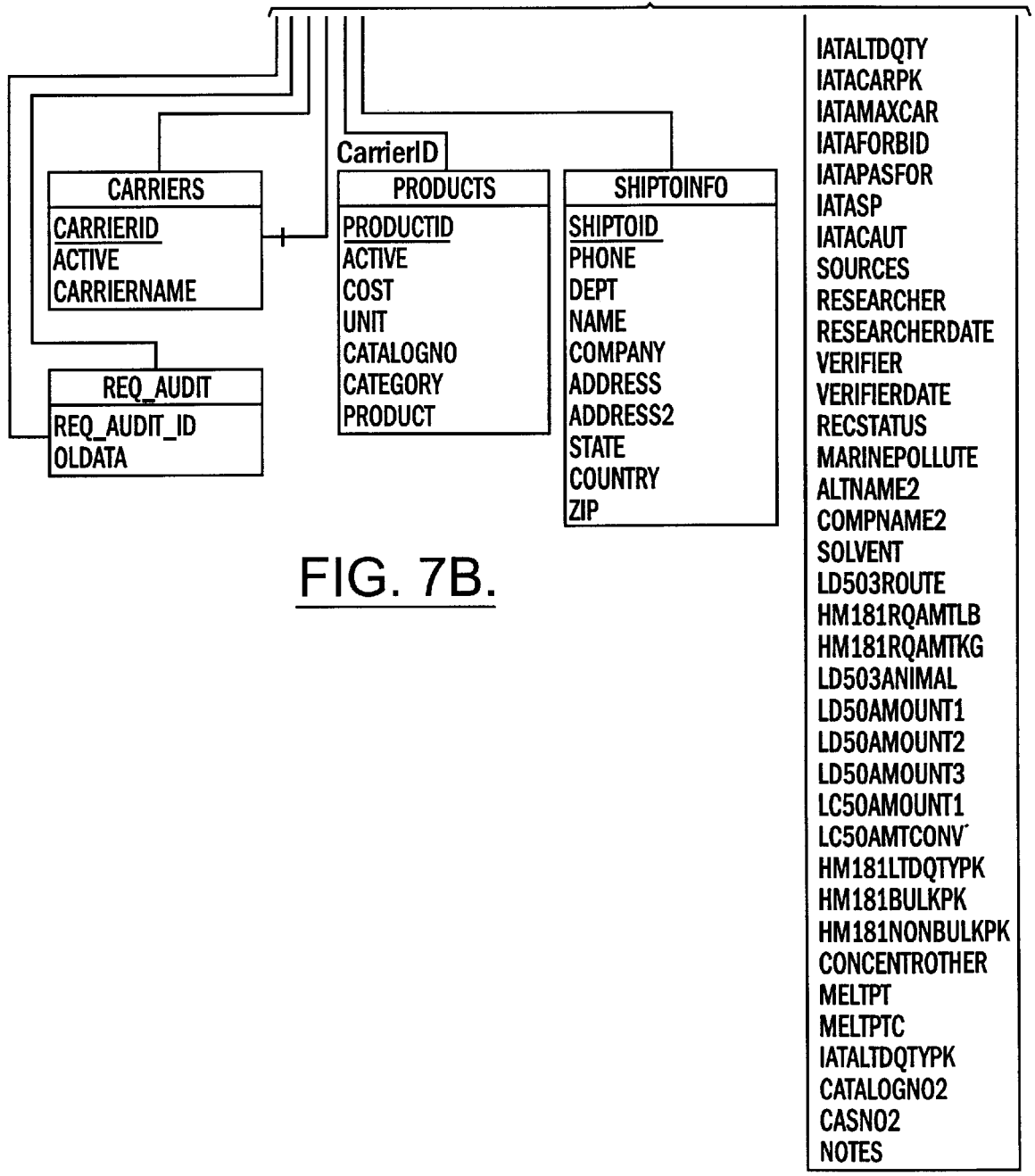
Figure 8A:
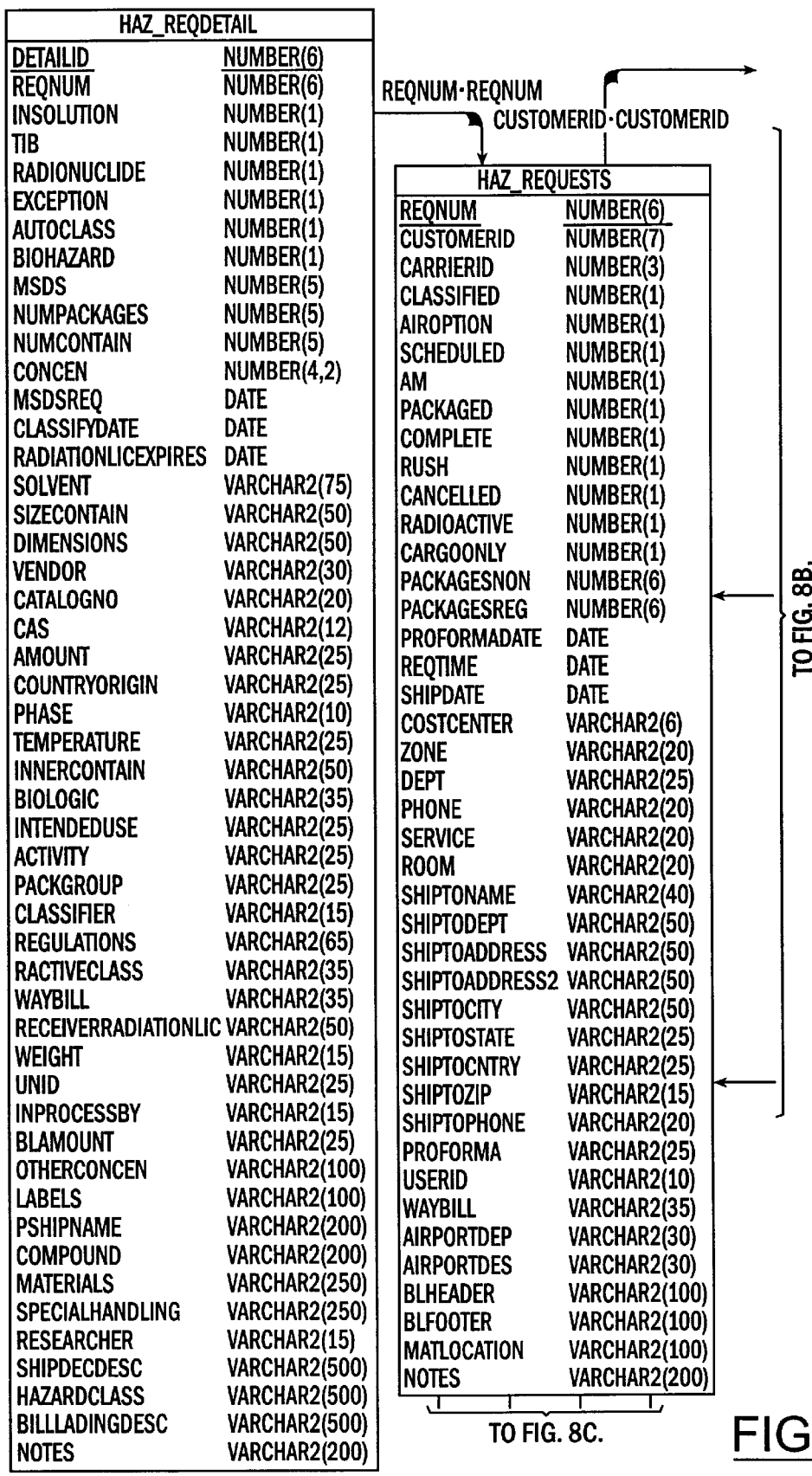
FIG. 8 is a physical model of the Hazardous Material Classification and Compliance System, according to the invention.
Figure 8B:
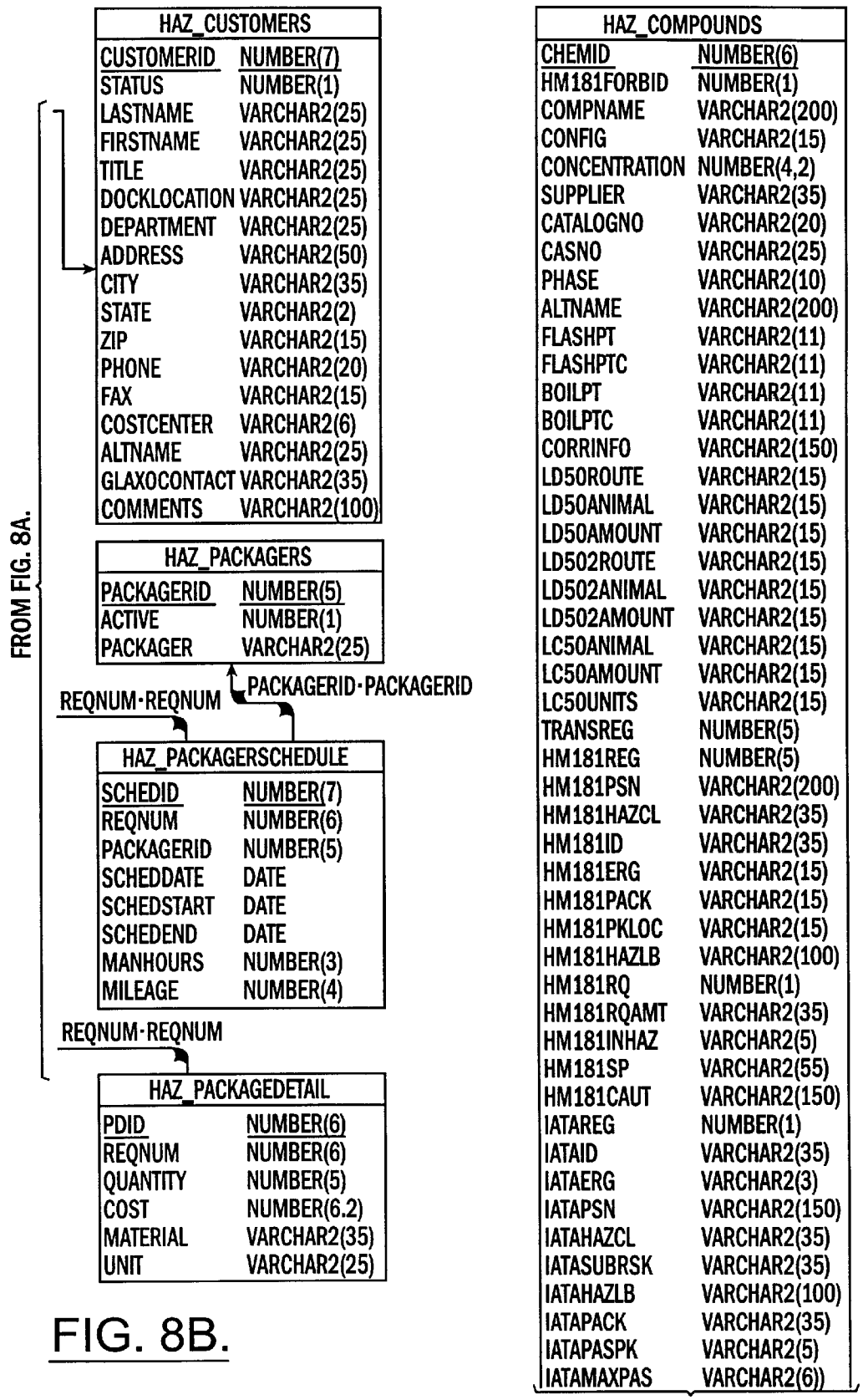
Figure 8C:
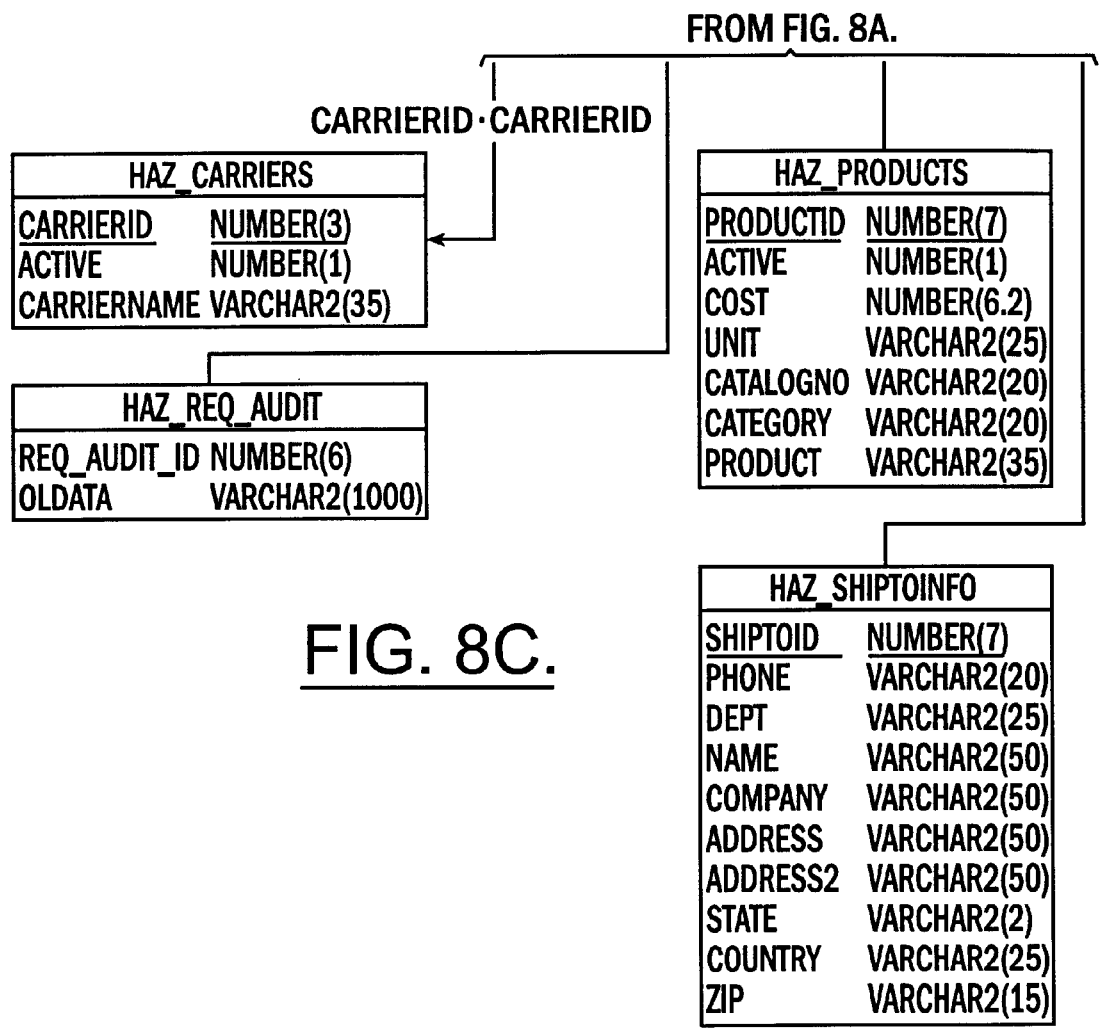

Referring to FIGS. 7 and 8, there is shown the data flow and relationships for HazClass 24. In particular, the conceptual model for HazClass 24 is illustrated in FIG. 7 and the physical data model is illustrated in FIG. 8.

The conceptual model illustrated in FIG. 7 illustrates the entities, attributes, data items, relationships and domains according to HazClass 24. The physical data model illustrated in FIG. 8 provides the physical implementation of the database, including tables, indexes, references and referential integrity of HazClass 24.

The graphical technique used to illustrate the design for the conceptual data model and physical data model is well known in the art and, hence, will be understood by those having skill in the art. Moreover, the graphical technique for understanding the conceptual data models and physical data models is described in detail in the publicly available Corporate User's Guide, SDP Technologies, Inc., 1993, Part 1, pp. 11–33, the disclosure of which is incorporated by reference herein.

Detailed Operation of HazClass

The sequence of operations performed by HazClass 24 will now be described in detail with reference to the screen interfaces (or displays) illustrated in FIGS. 9–28. It will be understood by those having skill in the art that the screen interfaces of FIGS. 9–28 illustrate the operational control flow of HazClass 24, which is implemented using event programming techniques rather than sequential programming. It will also be understood by those having skill in the art that the operational flow defined by the screen interfaces and their sequence, may be implemented by computer system 12, operating under stored program control.

The displays illustrated in FIGS. 9–28 are examples of displays which appear on display device 20 at various times during use of HazClass 24. Selection of options displayed on display device 20 may be made-by a user using any input device including a keyboard, a mouse, a virtual track ball, a light pen, or even a touch screen interface, individually or collectively. The system responds according to the selection made by the user.

Generally, during use of HazClass 24, a user can implement any of the modules 28, 30, 32 or subsystems 26, 34, 36, 38 from any point. For example, while in the classification module 30, a user may decide to temporarily terminate classification of the material and begin processing by the packaging module 32.

Detailed Operation: Request Entry Subsystem

Referring to FIG. 9, there is shown the primary Request Entry screen interface or display of request entry subsystem 26. The "Request Entry" interface includes three sections relating to the customer or originator material request: (i) the "Originator" section, indicated generally at 100, (ii) the "Ship To" section, indicated generally at 102, and (iii) the "Compound" section, indicated generally at 150.

While in the general mode for the material request, as illustrated in FIG. 9, the user is initially prompted on his/her display device 20 to enter the last name and first name of the originator at 108a and 108b, respectively. On exiting the first name field 108b, HazClass 24 conducts an automatic search of the HazClass database to determine if the identified originator has been previously entered and, hence, contained in the HazClass database. If the originator is in the HazClass database, the "Department" and "Material Location" (indicated generally at 104), and "Cost Center" and "Phone" (indicated generally at 106) fields will be entered automatically by HazClass 24. HazClass 24 then prompts the user to enter a "Ship Date" at 114, and the time of day, i.e., A.M. or P.M., at 116.

Alternatively, the user can employ the "QuickFind" field 120. The "QuickFind" field 120 lists in descending order all prior material requests shipped to date. By selecting the down arrow 121 adjacent to the "QuickFind" field 120, the user may select a prior request from the drop-down list or simply type in a request ID number to reference or edit a prior request. Upon exiting the QuickFind field 120, if an ID number is entered or selected, the interface will automatically reflect the selected record(s) and, hence, display all information available for the prior request on display device 20.

If the originator information is not contained in the HazClass database, the user is prompted to enter the noted originator information in the appropriate fields, indicated generally at 104 and 106, via input device 18. After entry of all the requisite information in the Originator section 100, the entered information may be edited (e.g., to correct misspellings) by selecting the "Edit" button 118.

Referring now to the "Ship To" section 102, the user is prompted to enter the name of the person/entity being shipped to in the section generally indicated at 128. As a user begins typing the name, an incremental search is performed by the request entry subsystem 26 as each key stroke on the input device 18 (i.e., keyboard) is entered to match the entry. Alternatively, the user may select "Name" from the QuickFind field 120 drop-down list and choose "Ship To" from the alphabetical list of entities which received prior shipments. The additional information, indicated generally at 128 and 130 (i.e., company, address, city, phone, etc.), is then automatically inserted by the request entry subsystem 26 from the HazClass database.

If the name typed in the "Ship To" section 128 is not found in the HazClass database, the screen interface shown in FIG. 10 is displayed. The HazClass 24 then prompts the user to enter the required information (i.e., Name, Company, etc.) in the appropriate fields, indicated generally at 109, via input device 18. The new "Ship To" information is then added to the HazClass database by selecting the "Ship To" interface "Save" key or button. Upon selecting the Ship To interface "Close" button 112, the interface shown in FIG. 9 is re-displayed on display device 20.

Referring now to the "Service", "Zone", and "Method" fields, indicated generally at 134. By selecting the down arrow 134a adjacent to the "Service" status field, the screen interface shown in FIG. 11 is displayed. The user may then select from the identified "Service Options", indicated generally at 136.

By selecting the down arrow 134b adjacent to the "Zone" status field, the screen interface shown in FIG. 12 is displayed. The user may then select from the identified "Zone Options", indicated generally at 138.

By selecting the down arrow 134c adjacent to the "Method" status field, an alphabetical list of approved carriers is provided. The user may then select a carrier.

The "Medium of Shipment" fields (i.e., air, ground or water), indicated generally at 140, are also selectable via input device 18 (i.e., mouse). An appropriate medium of shipment must be selected by the user or the user will be prohibited from saving the request record.

The status fields "Classified", "Scheduled", "Packaged", "Complete" and "Cancelled", indicated generally at 126, indicate the progress of the material processing. The status fields are selectable by the user via input device 18 (i.e., mouse). Validation of the status fields 126 is processed as follows: (i) "Scheduled" and "Packaged" are disabled for all requests marked "Info" in the "Service" field, indicated generally at 134, (ii) "Classified" is disabled until all compounds have been individually processed and a proper shipping name entered into the appropriate field (discussed in detail below), and (iii) "Cancelled" and "Complete" are mutually exclusive.

Referring now to the material or "Compound" section, indicated generally at 150, which comprises a list of all compounds previously entered and/or associated with the request. The listing is, however, "read-only."

Figure 13:
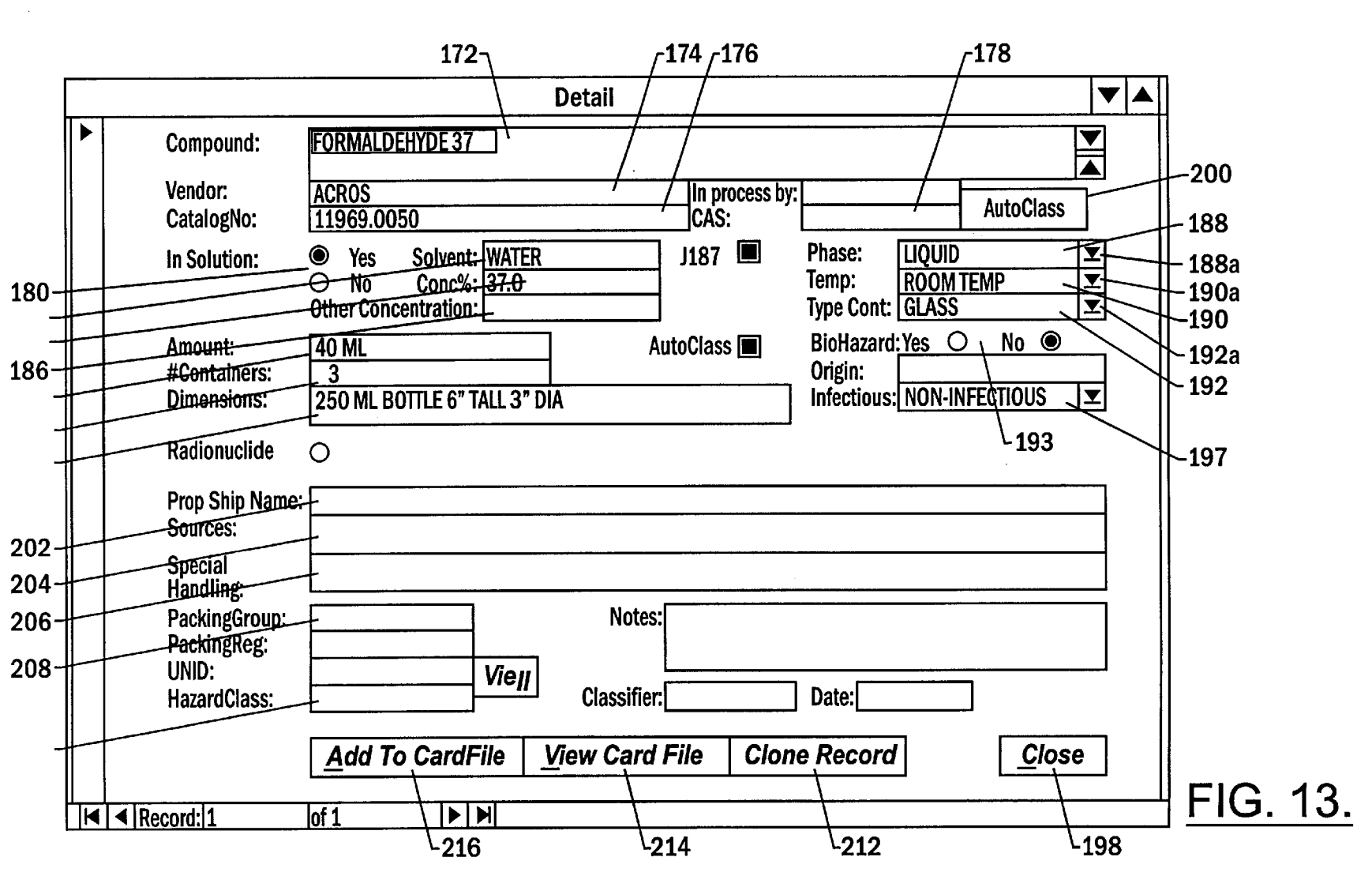

The user may modify any information provided or add a compound to the list by selecting the "Detail" key 152. When the "Detail" 152 is selected, the "Detail" screen interface shown in FIG. 13 is displayed.

The "Record Navigation Bar" of the primary request entry interface shown in FIG. 9 is indicated generally at 154. The Record Navigation Bar 154 provides the total number of records contained in the current filter. The Navigator Bar 154 includes arrow buttons 154a, 154b which allow the user to scroll back and forward through the available records. The single arrow 154a moves one record at a time and the double arrow 154b moves to the beginning or end of the records.

The additional navigation keys of the Request Entry interface include (i) the "Print" key 156, which initiates the "Packaging Module" 32, discussed in detail below; (ii) the "Packaging" key 158, which initiates the "Packaging Module" 32, discussed below; (iii) the "Clone" key 160, which initiates the clone subsystem and allows the user to duplicate the current record while generating a new shipping request (the Originator, ShipTo and, optionally, Compound Names are accordingly automatically entered); (iv) the request "Close" key 162, which closes the program; (v) the "Shipping Documents" key 164, which allows the user to print selected documents, such as a Bill of Lading, Shipper's Declaration, etc.; (vi) the "New" key 166, which initiates a new shipping request; and (vii) the "Save" key 168, which saves the current record.

Finally, the read-only "UserID" field 170 displays the UserID/number of the person who originiially entered the record, along with the date entered. If the rec,ord is modified after original entry, the subsequent UserID and date are additionally displayed.

Referring now to the "Detail" screen shown in FIG. 13, which is provided by selecting the compound "Detail" key 152. HazClass 24 prompts the user to enter the "Compound" requested for shipment in field 172 and the "Vendor", "Catalogue No." and "CAS" number in fields 174, 176, 178, respectively.

The user is then prompted to select "Yes" or "No" in the "In Solution" field, indicated generally at 180. If "Yes" is selected, indicating that the compound is in solution, HazClass 24 pronmpts the user to enter the name of the solvent(s) in which the compound is dispersed or dissolved. In the "Conc %" field 184, the percentage of dissolved compound relevant to the solvent(s) is entered. In the "Other Concentration" field 186, the user enters the percentages of each solvent (if more than one) as they correspond to the solvent(s) entered in the "Solvent" field 182.

By selecting the down arrow 188a adjacent to the "Phase" field 188, the user selects the form of the compound (i.e., liquid, solid, gas, aerosol). By selecting the down arrow 190a adjacent to the "Temp" field 190, the user identifies the transportation temperature of the compound. Finally, by selecting the down arrow 192a adjacent to the "Type Cont." field 192, the user selects the type of transportation container for the compound.

The user is further prompted to indicate whether the compound is biohazardous in "Biohazard" field, indicated generally at 193, and/or infectious in the "Infectious" field 197 and provide (i) the transportation amount or quantity in the "Amount" field 194, (ii) the total number of containers in the "Containers" field 195, and (iii) a unit of measure for the containers in the "Dimensions" field 196.

By selecting the Detail interface "Close" button 198, the screen illustrated in FIG. 13 closes and the primary request entry screen illustrated in FIG. 9 re-appears. In the "Notes" field 199, the user may enter any notes deemed pertinent to the request.

Upon completion of the request portion of HazClass 24, the user selects the request "Save" button 168 to save the record and "Close" button 162, which closes the screen.

Detailed Operation: Classification Module
Automatic Classification ("AutoClass")

Referring to FIG. 13, upon entry of the requested compound information in fields 172–178, the classification module 30 will attempt to automatically classify the identified compound via an AutoClass subsystem. If unsuccessful, the user may edit the information in. fields 172–178 and attempt a further automatic classification by selecting the "AutoClass" button 200.

The AutoClass subsystem includes the initial step of matching the information entered in any two of the Compound 172, Vendor 174, Catalogue No. 176 or CAS 178 fields to stored information in the HazClass "Cardfile Database." The matching cardfile must, however, have been researched and verified by two different independent Classifiers within a preceding time period set by a HazClass database administrator.

If the AutoClass subsystem is successful, appropriate information will be automatically entered in the following fields: "Prop Ship Name" 202, "Sources" 204, "Special Handling" 206, "PackingGroup" 208, and "HazardClass" 210. If unsuccessful, the Classifier may proceed to enter another compound, or simply close the screen. Once the screen is closed, whether auto-classed or not, the record is automatically saved, and the request record enters the Classifier que (discussed below) for classification and/or confirmation.

The "Clone Record" key 212 allows the Classifier to duplicate the current compound record and insert it as an additional record. This allows easy addition of similar compounds and duplicates only non-pertinent information to the actual classification, i.e., Proper Shipping Name will not be duplicated.

Non-AutoClass

Periodically, the classification module 30 provides a "Not Classified" pop-up window, such as that shown in FIG. 14, which appears on each Classifier display device 20. The pop-up window indicates the requests not classified. The non-classified pop-up window may also be produced by the Classifier from the HazClass menu by selecting, in sequence, "Searches" 147 and "Not Classified" 147b. To update the information provided in the pop-up window, the Classifier merely selects the not-classified "Refresh" button 218.

To classify one of the requests listed in the pop-up window, the Classifier selects desired request or selects the request ID number from the drop-down list in QuickFind field 120. The selected request, such as that illustrated in FIG. 9, will be displayed on the Classifier's display device 20.

Figure 15:
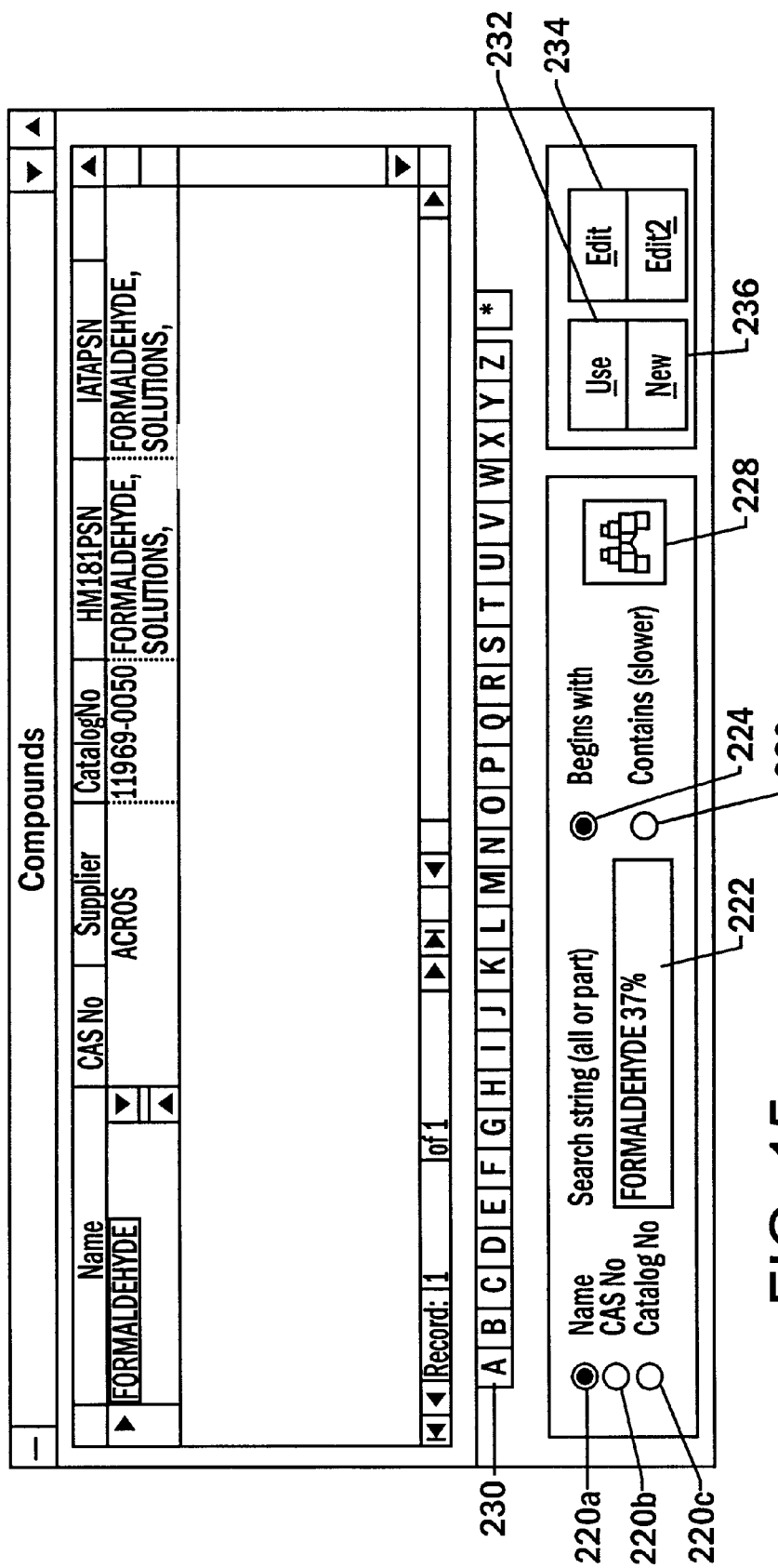

As stated, to access the Detail interface shown in FIG. 13, the Classifier selects the "Detail" button 152. By selecting the "View CardFile" button 214, the Classifier accesses the HazClass compound database. The compound look-up screen, illustrated in FIG. 15, is also displayed on display device 20.

If the Name button 220a is checked, the compound "Name" from the Detail interface is automatically displayed in the "Search String" field 222. If the Classifier selects the find or "Binoculars" button 226, (and the "Begins With" button 224 is checked), the classification module 30 searches for all compounds that begin with the information in the search string field 222. If the "Contains" field 226 is checked and the "Binoculars" button 226 selected, the module 30 searches for all compounds that contain the information in the search string field 222.

The Classifier may also simply call up all records alphabetically by selecting the appropriate button key(s), indicated at 230. "Name Searches" search both the name field and the alternate name field. CAS Number and Catalog Number searches are also available, by selecting or checking buttons 220*b*, 220*c*, respectively. If the Classifier locates the appropriate record in the list box and has complete confidence that the record is correct, the Classifier may simply select the Use button 232, and all available classification information will be automatically transferred to the detail screen shown in FIG. 13. The information transferred may include Proper Shipping Name, Sources, PackingGroup, UNID, HazardClass, Labels and Notes. Since a reclassification is possible, if information in all fields on the detail screen is provided, the Classifier will be prompted to overwrite, with the option of keeping existing information.

Optionally, the Classifier may choose to edit the selected record, or to add a new record by selecting either "Edit" button 234 or "New" button 236. This will provide the Edit interface shown in FIG. 16. The Classifier is then prompted by HazClass 24 to enter the requisite information in the noted fields, indicated generally at 260.

When the Classifier selects the "CFR 49" button 240, the CFR 49 interface shown-in FIG. 17 is displayed. Again, the Classifier is prompted to enter the appropriate information (e.g., Proper Shipping Name, Hazard Class, etc.) in each field, indicated generally at 262. Similarly, when the Classifier selects the "IATA" button 242, or, "Toxicity" button 244, the interfaces illustrated in FIGS. 18 and 19, respectively, are displayed. The Classifier is prompted by HazClass 24 to enter the appropriate information in the identified fields, indicated generally at 264, 266, respectively.

Upon completion of the classification steps set forth above, the Classifier clicks the "Classified" status field 248 to confirm the request has been classified (see FIG. 9).

Detailed Operation: Scheduling Module

The scheduling module 28 similarly provides a "Not Scheduled" pop-up window, such as that shown in FIG. 20, which appears on each Scheduler's display device 20. The pop-up window indicates all non-scheduled requests, which can be updated by the Scheduler by selecting the scheduling "Refresh" button 300. The non-scheduled pop-up window may also be produced by the Scheduler from the HazClass menu by selecting, in sequence, "Searches" 147 and "Not Scheduled" 147*d*.

To schedule one of the listed requests, the Scheduler selects the desired request (by highlighting via mouse) or selects the request ID, indicated generally at 310, from the drop-down list in QuickFind field 120 (See FIG. 9).

The selected request is displayed on the display device 20 as shown in FIG. 9. The Scheduler selects "Packaging" key 158, which provides the Packaging Order interface (discussed in detail below) shown in FIG. 21.

Figure 22:
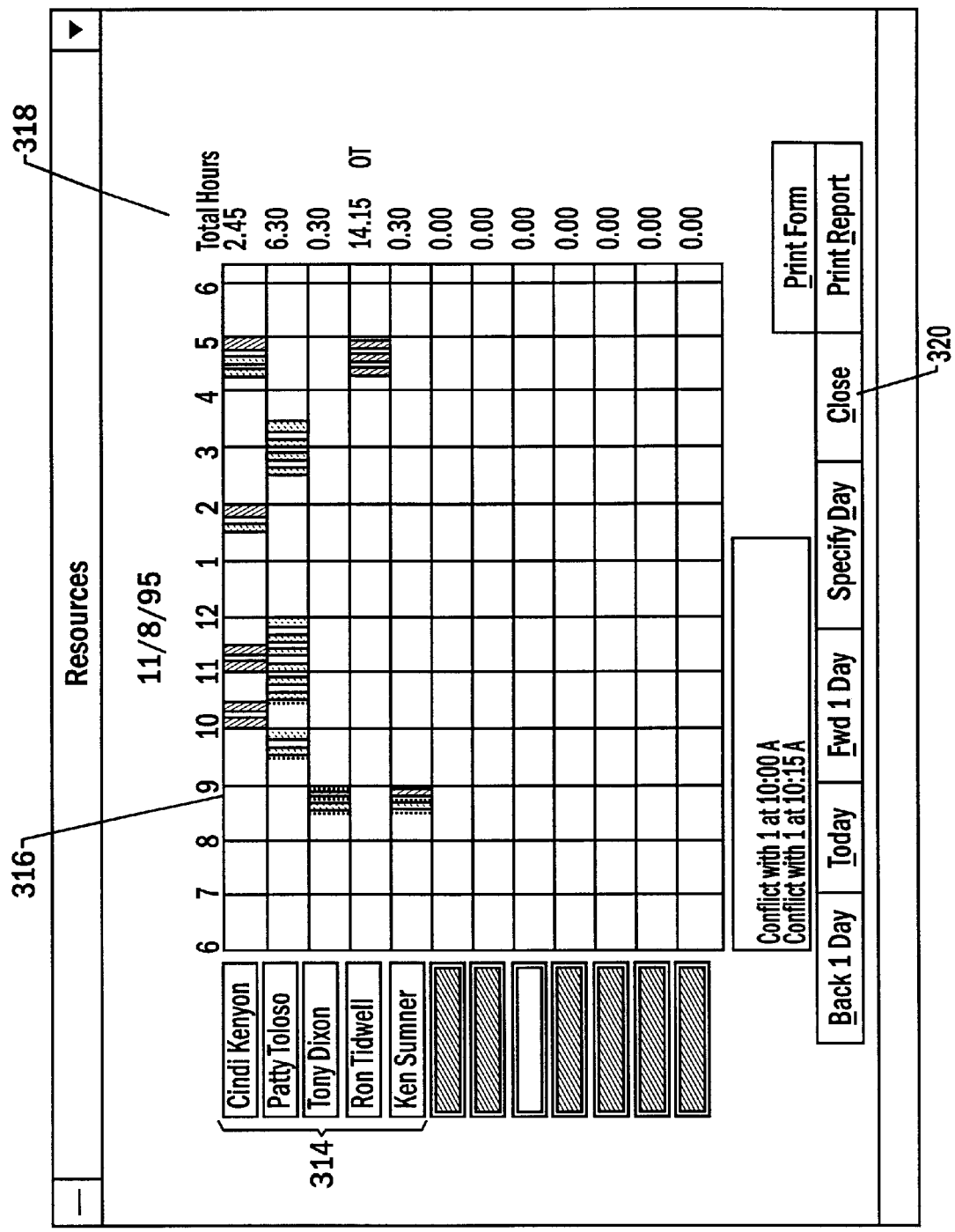

The Scheduler then selects the "Schedule" key 312, which provides the "Resources" interface shown in FIG. 22 The interface, which is displayed on the Scheduler's display device 20, provides the name of each Packager, indicated generally at 314. Each Packager's schedule, indicated generally at 316 and the estimated time of each Packager's assigned task, indicated generally at 318.

Figure 21:
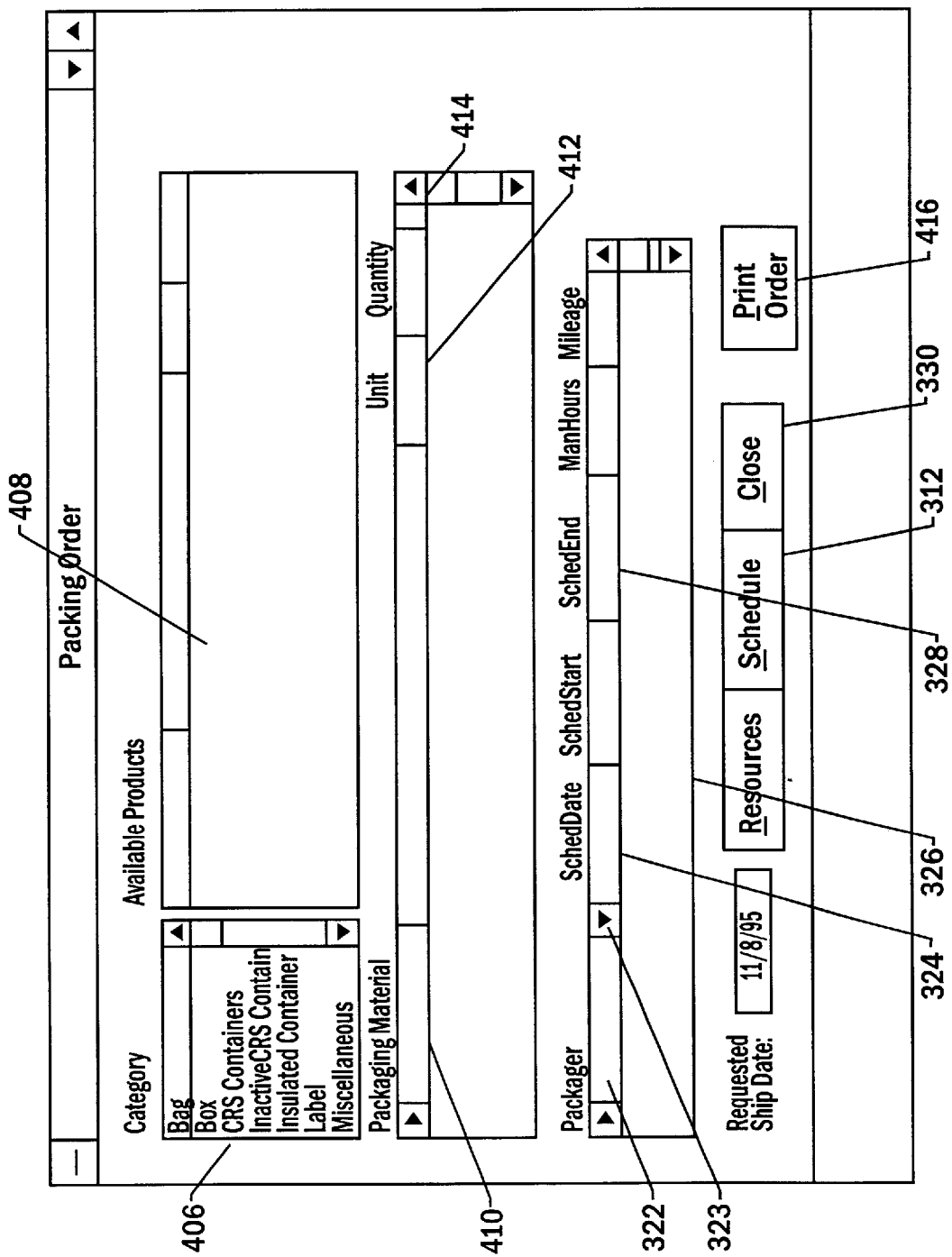

After the Scheduler selects an available Packager, the Scheduler selects the Resources "Close" button 310 to return to the Packaging Order interface shown in FIG. 21. The Scheduler selects the down-arrow 323 adjacent the "Packager" field 322, which provides a drop-down list of all Packagers. The Scheduler selects the designated Packager whose name appears in the "Packager" field 322. The scheduled date of shipment is entered in the "SchedDate" field 324, the scheduled start time is entered in the "SchedStart" field 326 and the scheduled end time of shipment entered in the "SchedEnd" field 328. By selecting the Packaging Order "Close" button 330, the primary Request Entry interface shown in FIG. 9 re-appears on the display device 20.

Upon completion of scheduling, the Scheduler clicks the "Scheduled" status field 332 to confirm? that the request has been scheduled.

Detailed Operation: Packaging Module

The packaging module 32 also provides a "Not Packaged" pop-up window, such as that shown in FIG. 23, which appears on each Packager's display device 20. The pop-up window indicates all non-packaged requests, which can be updated by the Packager by selecting the packaging "Refresh" button 400. The pop-up window may also be produced by the Packager from the HazClass menu by selecting, in sequence, "Searches" 147 and "Not Packaged" 147*c*.

To package one of the listed requests, the Packager selects the desired request (by highlighting via mouse) or selects the request ID, indicated generally at 402, from the drop-down list in the QuickFind field 120 (See FIG. 9).

The selected request is displayed on the display device 20 as shown in FIG. 9. The Packager initially selects the "Detail" key 152 to access the Detail interface (discussed in detail below) shown in FIG. 13 and verify the information provided in the "Amount" field 194, "# containers" field 195, "Dimensions" field 196, "Temp" field 190 and "Phase" field 188.

The Packager then selects the Detail "Close" button 198 to return to the Request Entry screen shown in FIG. 9. To verify that the appropriate supplies have been ordered, the Packager selects the "Packaging" button 158, which produces the Packaging Order interface shown in FIG. 21.

In the "Category" field 408, the Packager selects the type of supply (or supplies) needed for the request by highlighting the indicated item with the input device 18 (i.e., mouse). The Packager is then prompted to select the product(s) needed in the "Available Products" field 408.

HazClass 24 automatically enters the product(s) selected by the Packager in the "Packaging Material" field 410. If necessary, the Packager can change the unit and quantity indicated in the "Unit" and "Quantity" fields 412, 414. If desired, the Packager can print a copy of the ordered supplies by selecting the "Print Order" button 416.

To return to the Request Entry interface, the Packager selects the "Close" button 330. In the "Notes" field 199 the Packager confirms that the required supplies were ordered.

To continue the packaging task, the Packager selects the "Shipping Docs" button 164. Selecting the "Shipping Docs" button 164 produces the Shipping Documents interface shown in FIG. 24. As discussed below, the Packager can generate any of the noted documents by selecting the appropriate document button 420, 422, 424, 426.

To generate a bill of lading, the Packager selects the "Bill of Lading" button 420. The "Bill of Ladling" button 420 produces the interface shown in FIG. 25.

HazClass 24 then prompts the Packager to enter the carrier in the "Named Carrier" field 430 and the current date in the "Date" field, indicated generally at 432. HazClass 24 then automatically displays the noted information (of record) indicated generally at 434*a*, 434*b* and 434*c*, which is verified and, if necessary, modified by the Packager.

Figure 26:
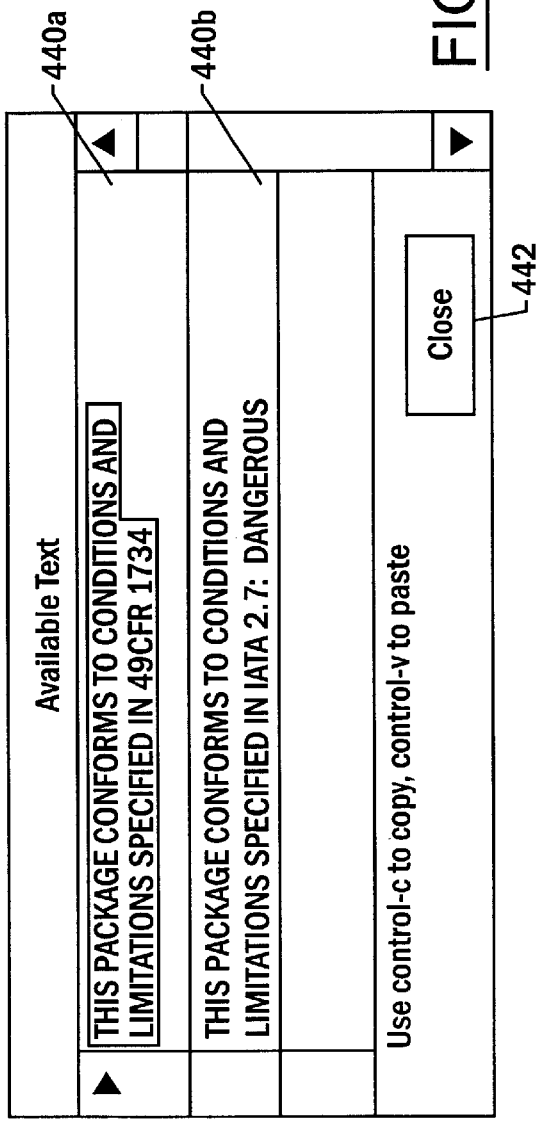
Figure 27:
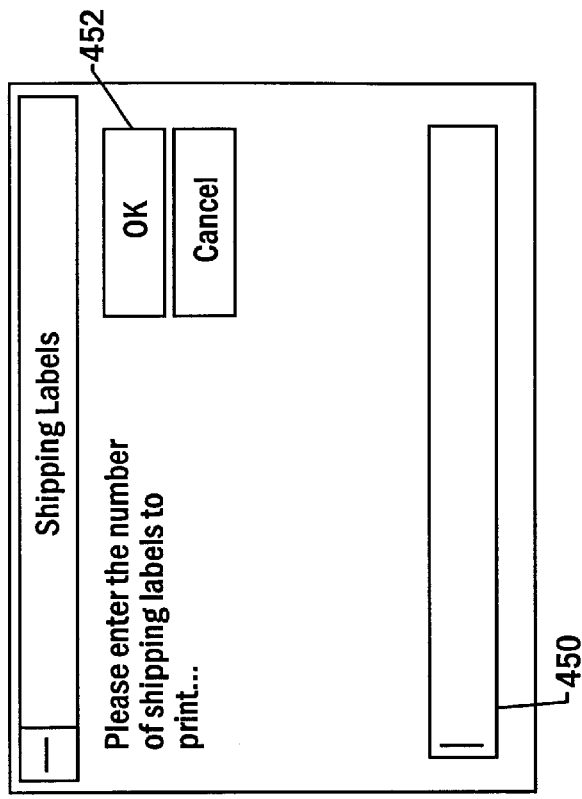

The "Use Text" button 438 produces the interface shown in FIG. 26. To print available text, such as that shown in fields 440*a*, 440*b*, on the packaging order, the Packager merely (i) highlights the desired text (via mouse), (ii)

simultaneously presses the Ctrl and C keys on the input device 18 (i.e., keyboard), and (iii) presses the Ctrl and V keys.

Figure 25:
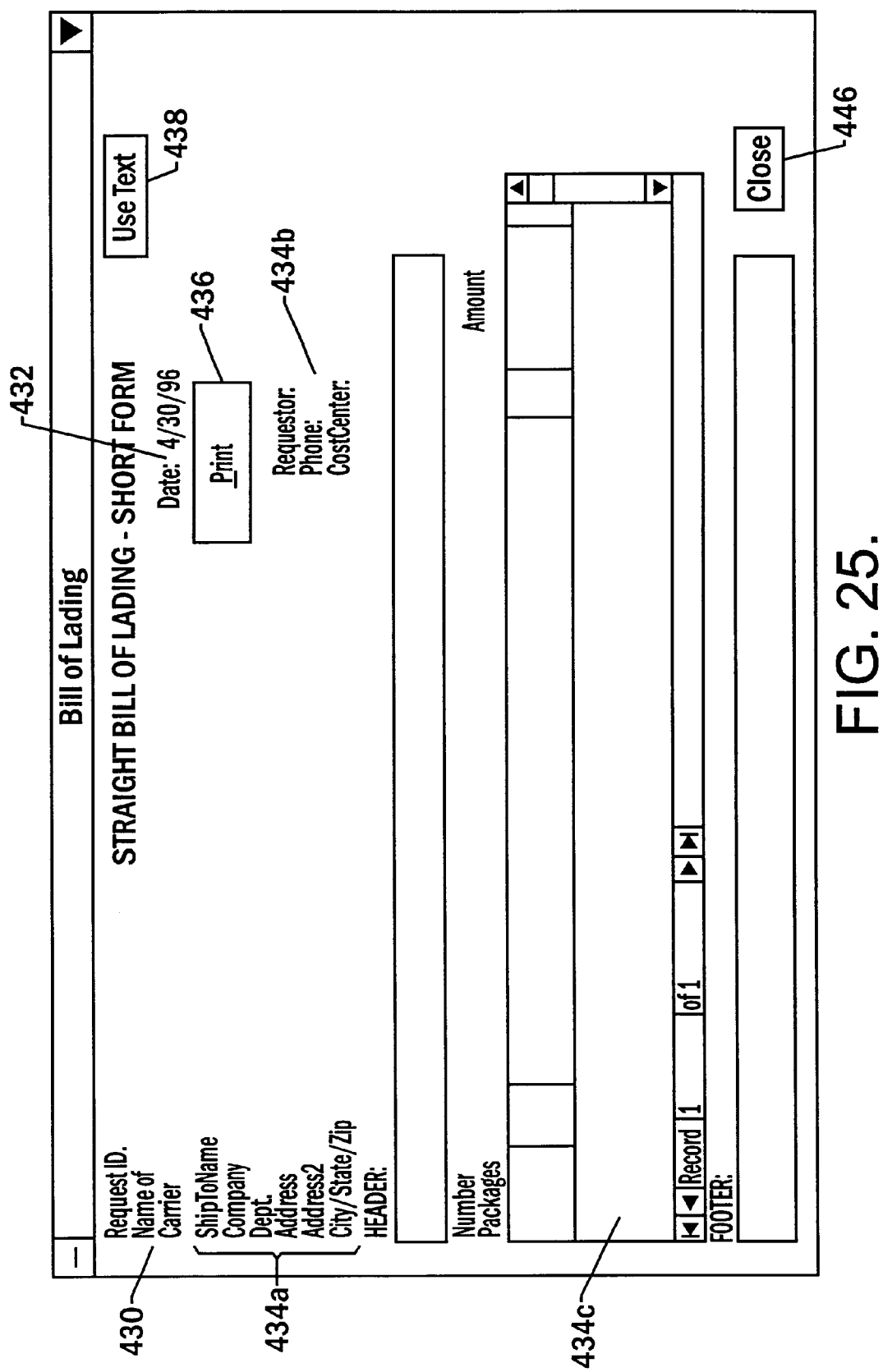

To return to the Bill of Lading interface shown in FIG. 25, the Packager selects the text "Close" button 442. To print a bill of lading form for the current request, the Packager selects the "Print" button 436. The screen is closed and the Packager r-.turned to the Shipping Documents interface shown in FIG. 24 by selecting the "Close" button 446.

To generate the appropriate shipping labels the Packager selects the "Shipping Labels" button 426. The "Shipping Labels" button 426 produces the interface shown in FIG. 27.

HazClass 24 then prompts the Packager the enter the number of labels to print in the "No." field 450. After entering the designed number of shipping labels, the Packager selects the labels "Close" button 452 to return to the Shipping Documents interface shown in FIG. 24.

In additional envisioned embodiments, the Shipping Documents interface includes a "Packaging List" button (shown in phantom) 427. By selecting the "Packaging List" Button 427, the Packaging Module 32 of HazClass 24 provides a list of all materials contained in one package.

After printing the required shipping documents, the Packager selects the Shipping Documents "Close" button 428 to return to the Request entry interface shown in FIG. 9. The Packager then clicks the "Packaged" status field 458 to confirm that the request has been packaged.

Detailed Operation: Auditing Subsystem

To initiate an audit of the HazClass 24 process, the user selects the "AUDIT" option (not shown) from the "Searches" pull-down menu 147. Selecting "AUDIT" produces the AUDIT interface shown in FIG. 28.

The designated request is identified in the "REQUESTID" field, indicated generally at 500. The date range (or record set) selected by the user is provided in the "Date" field 502. The user can scroll forward or backward through the date range by selecting the "NEXT" button 506 or "PREVIOUS" button 504.

Figure 28:
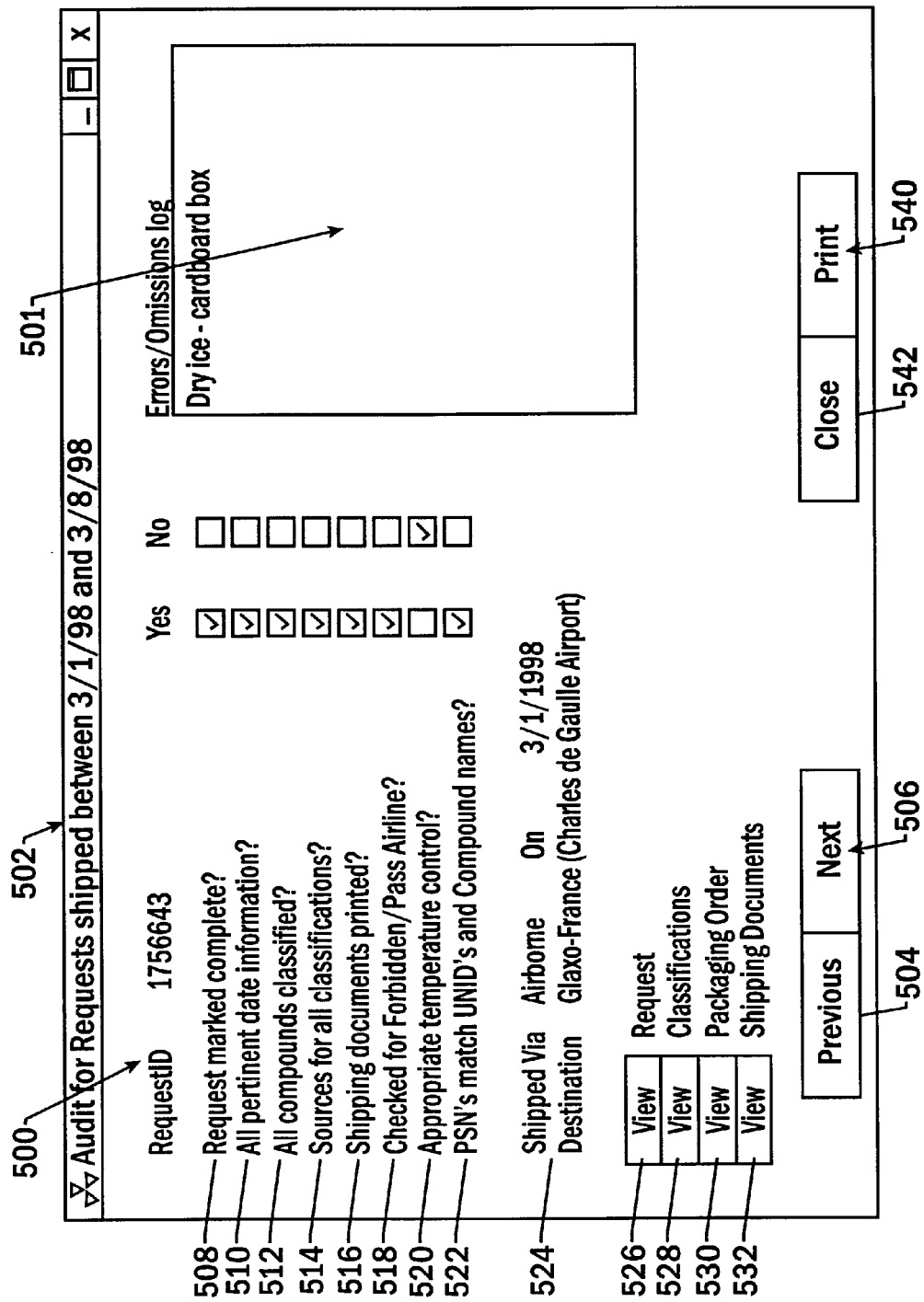
Figure 29:
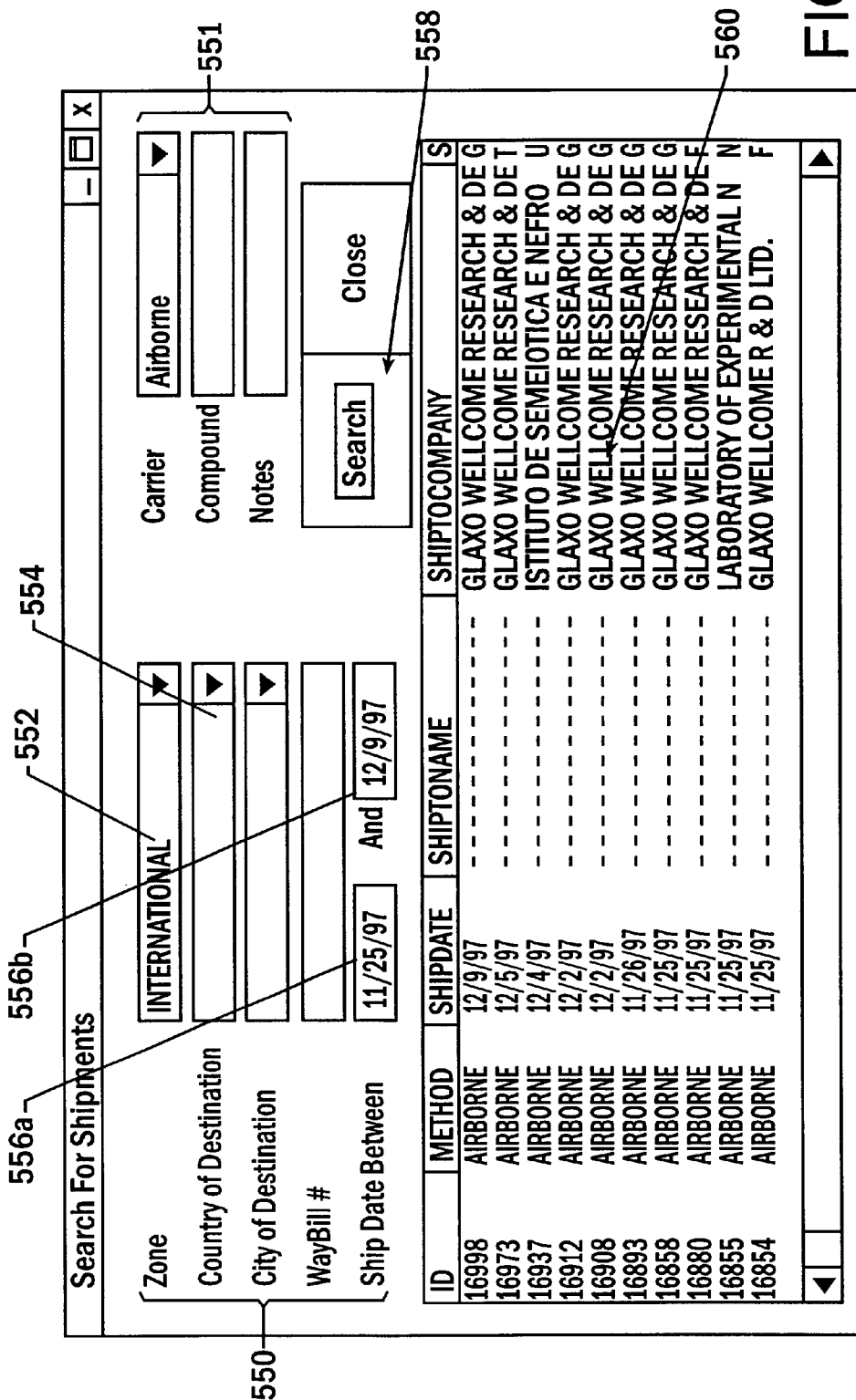

As illustrated in FIG. 28, the Audit interface further includes the following eight (8) inquiry fields, each having respective "YES" and "NO" read-only response boxes: (i) "Request marked complete?" 508; (ii) "All pertinent date information?" 510; (iii) "All compounds classified?" 512; (iv) "Sources for all classifications?" 5141; (v) "Shipping documents printed?" 516; (vi) "Checked for Forbidden/Pass Airline?" 518; (vii) "Appropriate temperature control?" 520; and (viii) "PSN's match UNID's and Compound Names?" 522.

The "Request marked complete?" field 508 indicates whether a valid user completed the request. The "Request marked complete?" field 508 further indicates whether the date of the requested action is reasonable.

The "All pertinent date information?" field 510 reflects the results of a series of tests on various date fields, such as the request being shipped before it was classified, user's training dates expiring before the user's job was accomplished. For example, if a Packager whose Hazardous Material (i.e., HAZMET) training level expired on Feb. 15, 1999 packaged a request on Feb. 16, 1999, the action would generate an audit error in field 501.

The "All compounds classified?" field 512 indicates whether every compound in the shipment was actually classified by a valid Classifier. The "Sources for all classifications?" field 514 indicates whether the Classifier(s) entered information into the source fields and that the Classifiers were valid users.

The "Shipping documents printed?" field 516 indicates whether the Bill of Lading, Shipper's Declaration, and other appropriate shipping documents were printed, and that the date was reasonable. The "Checked for forbidden/pass airline?" field 518 indicates whether the carrier choice was appropriate, i.e., if the "Yes" box is checked, the carrier must be a cargo carrier.

The "Appropriate temperature controls?" field 520 indicates whether the packaging materials were reasonable for the shipping conditions. For example, shipping dry ice in cardboard will generate an audit error in field 501.

Finally, the "PSN's match UNID's and Compound Names?" field 522 indicates whether the proper shipping names, names found in UNID (BRG tables) and compound names are at least similar.

Referring now to the destination field, indicated generally at 524. The destination field 524 provides basic information on the destination of the shipment and the carrier.

The Audit interface also includes command buttons that open selected HazClass 24 interfaces or forms. The Request "View" button 526 opens the primary Request Entry interface as shown in FIG. 9. The Classification "View" button 528 opens the Detail interface as shown in FIG. 13. The Packaging Order "View" button 530 opens the Packaging Order interface as shown in FIG. 21. The Shipping Documents "View" button 532 produces the Bill of Lading and Shipper's Declaration Reports.

The Audit "Print" button 540 will generate a full audit report for all requests identified by the user. Finally, the Audit "Close" button 542 closes the display.

Detailed Operation: Emergency Response Subsystem

Referring now to FIG. 28, there is shown the "Emergency Response Information" interface which is generated by the user by selecting "Searches" 147 and "Emergency Response Search" 147a from the HazClass menu. According to the invention, the Emergency Response subsystem 36 allows the user to search for specific material requests via the criteria or information in the noted fields, indicated generally at 550 and 551.

To illustrate the effectiveness of the emergency response subsystem 36, consider, for example, a shipment containing hazardous materials arriving at an airport in France. Upon landing, the airport baggage personnel observe a box measuring approximately two foot square leaking to the extent that all shipping documents attached to the box are destroyed. The only information available to the airport personnel is that the box originated from Company X and included a hazardous material label. The baggage personnel thus contact the airport authorities, who in turn, contact Company X.

Company X accesses HazClass 24, where an authorized user generates the Emergency Response Information interface shown in FIG. 28. The user enters "International" in the zone field 552, "France" in the "Country" field 554 and the preceding two days in the "Ship Date Between" fields 556a, 556b. By selecting the "Search" button 558, the (emergency response subsystem 36 conducts a search of all requests in the HazClass database having shipping date between the designated shipping dates. The results of the search are provided in the "Shipments" field 560.

The user then selects each record provided in the "Shipments" field 560 which automatically opens the primary Request Entry interface, to examine each record. Upon determining the exact shipment, the user determines the proper shipping name(s) and the handling precautions appropriate to the material, obtains the MSDS (Material Safety Data Sheet), if necessary, and communicates this information to the airport authorities in France.

As will be appreciated by one having ordinary skill in the art, the emergency response subsystem 36 thus provides prompt, accurate and effective information regarding hazardous material shipments, which is unparalleled in the art.

SUMMARY

From the foregoing description, one of ordinary skill in the art can easily ascertain that the present invention provides a material classification and compliance system that facilitates the proper processing, documentation, packaging and handling of regulated and non-regulated materials. The system also includes an emergency response component which provides prompt, accurate and effective information regarding hazardous material shipments.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A computer-based material classification and compliance system comprising:
    a computer system having processing means, data storage means, display means and input means;
    first prompting means, for prompting on said display means for user entry via said input means, and for storing in said data storage means, the identity and history of information corresponding to an originator of a request for material;
    second prompting means, for prompting on said display means for user entry via said input means, and for storing in said data storage means, the identity and history information corresponding to a recipient of said material;
    third prompting means, for prompting on said display means for user entry via said input means, and for storing in said data storage means, the properties and characteristics of said material;
    classification means, responsive to said material properties and characteristics, for classifying said material and for storing said material classification in said data storage means;
    fourth prompting means, for prompting on said display means for user entry via said input means, and for storing in said data storage means, a packaging and shipping schedule for said material; and
    fifth prompting means, for prompting on said display means for user entry via said input means, and for storing in said data storage means, the packaging materials required for transport of said material.

2. The material classification and compliance system of claim 1, wherein said material comprises a hazardous material.

3. The material classification and compliance system of claim 1, wherein said material comprises a non-regulated material.

4. The material classification and compliance system of claim 1, wherein said data storage means includes an originator database, said originator database being stored in said data storage means and including the identity and history information corresponding to at least one prior originator of a request for said material, a recipient database, said recipient database being stored in said data storage means and including the identity and history information corresponding to at least one prior recipient of said material, a material classification database, said material classification database being stored in said data storage means and including material names, identification, properties, characteristics, hazards, hazardous classes, toxicity, handling instructions, Code of Federal Regulations provisions, IOTA provisions, and a packaging material database, said packaging material database being stored in said data storage means and including a list of packaging materials.

5. The material classification and compliance system of claim 4, wherein said system further includes originator association means for associating said originator identity and history information stored via said first prompting means and said prior originator identity and history information stored in said originator database, and providing said prior originator identity and history on said display means.

6. The material classification and compliance system of claim 4, wherein said system further includes recipient association means for associating said recipient identity and history information stored via said second prompting means and said prior recipient identity and history information stored in said recipient database, and providing said prior recipient identity and history on said display means.

7. The material classification and compliance system of claim 4, wherein said system further includes material association means for associating said material properties and characteristics stored via said third prompting means and said material classification database, and providing a material classification on said display means.

8. The material classification and compliance system of claim 7, wherein said material classification is automatically provided upon entry of said material properties and characteristics via said third prompting means.

9. The material classification and compliance system of claim 4, wherein said system further includes packaging association means for associating said material properties and characteristics and said packaging database, and providing the required packaging materials on said display means.

10. The material classification and compliance system of claim 1, wherein said system further includes self-auditing means for auditing said system and confirming compliance with statutory regulations and mandates.

11. The material classification and compliance system of claim 1, wherein said system further includes emergency response means for providing said originator identity and history information stored via said first prompting means, said recipient identity and history information stored via said second prompting means, said material properties and characteristics stored via said third prompting means and said packaging materials stored via said fifth prompt ing means, said emergency response means including sixth prompting means, for prompting on said display means for user entry via said input means, origination information of said material, destination information of said material and shipment date of said material, and emergency response associating means for associating said material origination information, said material destination information, and said material shipment date and said originator identity and history information, said recipient identity and history information, said material properties and characteristics and said packaging materials, and providing on said display means said originator identity and history information, said recipient identity and history information and said material properties and characteristics corresponding to said origination information, said destination information and said material shipment date.

12. The material classification and compliance system of claim 1, wherein said system further includes first generating means for generating a packaging order based on said packaging materials stored via said fifih prompting means.

13. The material classification and compliance system of claim 1, wherein said system further includes second generating means for generating shipping documents based on said originator identity and history information, said recipient identity and history information and said material properties and characteristics, said shipping documents including bills of lading, shipping labels, shipper's declarations, way bills and packaging lists.

14. The material classification and compliance system of claim 1, wherein said system further includes third generating means for generating reports, said reports including metrics reports, invoice/cost analysis reports, accounting reports, emergency information reports, manpower and utilization reports, supplies usage reports, material history and track ing reports and auditing reports.

15. The material classification and compliance system of claim 1, wherein said system further includes security means for controlling access to said first, second, third, fourth, fifth and sixth prompting means and said first, second, third and fourth generating means, said security means including user identification codes and assigned user groups, said user identification codes being associated with assigned authorization levels, said user groups being associated with at least one of said first, second, third, fourth, fifth and sixth prompting means and said first, second, third and fourth generating means.

16. A computer-based hazardous material classification method which executes on a computer system having input means, processing means, data storage means, display means, said hazardous material classification method comprising the steps of:

prompting on said display means for user entry via said input means, and for storing in said data storage means, the identity and history of information corresponding to an originator of a request for material;

prompting on said display means for user entry via said input means, and for storing in said data storage means, the identity and history information corresponding to a recipient of said material;

prompting on said display means for user entry via said input means, and for storing in said data storage means, the properties and characteristics of said material; and providing a material classification based on said material properties and characteristics.

17. The hazardous material classification method of claim 16 fuirther comprising the steps of:

prompting on said display means for user entry via said input means, and for storing in said data storage means, a packaging and shipping schedule for said material; and prompting on said display means for user entry via said input means, and for storing in said data storage means, the packaging materials required for transport of said material.

18. The hazardous material classification method of claim 17 further comprising the steps of:

storing the identity and history information correspondipg to at least one prior originator of a request for said material in said data storage means;

storing the identity and history information corresponding to at least one prior recipient of said material in said data storage means;

storing a material classification database in said data storage means, said material classification database including material names, identification, properties, characteristics, hazards, hazardous classes, toxicity, handling instructions, Code of Federal Regulations provisions, and IOTA provisions; and storing a list of packaging materials in said data storage means.

19. The hazardous material classification method of claim 18, further comprising the steps of:

associating said originator identity and history information and said prior originator identity and history information, and providing said prior originator identity and history on said display means;

associating said recipient identity and history information and said prior recipient identity and history information, and providing said prior recipient identity and history on said display means;

associating said material properties and characteristics and said material clasification database, and automatically providing a material classification on said display means; and associating said stored material properties and characteristics and said packaging database, and providing the required packaging materials on said display means.

20. The hazardous material classification method of claim 18, further comprising the steps of:

prompting on said display means for user entry said input means, material origination information, material destination information and material shipment date; and associating said material origination information, said material destination information, and said material shipment date and said originator identity and history is information, said recipient identity and history information, said material properties and characteristics and said packaging materials, and providing on said display means said originator identity and history information, said recipient identity and history information, and said material properties and characteristics corresponding to said origination information, said destination information and said material shipment date.

21. The hazardous classification method of claim 16, further comprising the steps of:

generating a packaging order based on said stored packaging materials; and generating shipping documents based on said originator identity and history information, said recipient identity and history information and said material properties and characteristics, said shipping documents including bills of lading, shipping labels, shipper's declarations, way bills and packaging lists.

* * * * *

UNITED STATES PATENT AND TRADEMARK OFFICE
CERTIFICATE OF CORRECTION

PATENT NO. : 6,397,115 B1
DATED : May 28, 2002
INVENTOR(S) : Basden, Richard A.

It is certified that error appears in the above-identified patent and that said Letters Patent is hereby corrected as shown below:

<u>Title page,</u>
Item [73], Assignee, where it reads: "SmithKline Beecham" change to -- SmithKline Beecham Corporation --

<u>Column 20,</u>
Line 49, delete "prompt ing" and replace with -- prompting --

<u>Column 21,</u>
Line 17, delete "track ing" and replace with -- tracking --

<u>Column 22,</u>
Line 60, delete "correspondipg" and replace with -- corresponding --

Signed and Sealed this

Twenty-first Day of January, 2003

JAMES E. ROGAN
*Director of the United States Patent and Trademark Office*